(12) United States Patent
Lin

(10) Patent No.: US 11,558,904 B2
(45) Date of Patent: Jan. 17, 2023

(54) METHOD AND APPARATUS FOR UPLINK GRANT OVERRIDDEN IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 12 days.

(21) Appl. No.: 17/088,193

(22) Filed: Nov. 3, 2020

(65) Prior Publication Data

US 2021/0136830 A1 May 6, 2021

Related U.S. Application Data

(60) Provisional application No. 62/931,439, filed on Nov. 6, 2019.

(51) Int. Cl.
*H04W 74/08* (2009.01)
*H04W 72/04* (2009.01)
*H04W 72/14* (2009.01)

(52) U.S. Cl.
CPC ... *H04W 74/0833* (2013.01); *H04W 72/0413* (2013.01); *H04W 72/0446* (2013.01); *H04W 72/14* (2013.01)

(58) Field of Classification Search
None
See application file for complete search history.

(56) References Cited

U.S. PATENT DOCUMENTS

2016/0270038 A1* 9/2016 Papasakellariou .. H04W 72/042
2020/0252914 A1* 8/2020 Yang ..................... H04W 76/27

FOREIGN PATENT DOCUMENTS

KR 20180083819 A 7/2018

OTHER PUBLICATIONS

R2-1818792 Huawei "Handling of overlapped configured grant and UL grant received in RAR" 3GPP WG2#104 Spokane Nov. 12-16, 2018 (Year: 2018).*
R1-1900337 CATT "Discussion on intra-UE multiplexing scenarios" 3GPP WG1 AdHoc#1901 Taipei Jan. 21-25, 2019 (Year: 2019).*
R1-1902182 Sony "Considerations on UL Intra-Ue Tx Multiplexing" Athens Feb. 25- Mar. 1, 2019 (Year: 2019).*
3GPP TS 38.321 version 15.3.0 "5G NR MAC protocol specification" Sep. 2018 relevant pages (Year: 2018).*
Corresponding Korean Patent Application No. 10-2020-0145303, Office Action dated Mar. 30, 2022. English Translation.
Huawei et al., R2-1818792, Handling of overlapped configured grant and UL grant received in RAR, 3GPP TSG RAN WG2 #104, published date (Nov. 17, 2018).
CATT, R1-1900337, Discussion on intra-UE multiplexing scenarios, 3GPP TSG RAN WG1 #AH, 3GPP server release date (Jan. 12, 2019).

* cited by examiner

*Primary Examiner* — Basil Ma
(74) *Attorney, Agent, or Firm* — Cooper Legal Group LLC

(57) ABSTRACT

A method and apparatus are disclosed. In an example from the perspective of a User Equipment (UE), the UE may receive a configured grant. The UE may receive a Random Access Response (RAR) grant, wherein a first Physical Uplink Shared Channel (PUSCH) of the RAR grant overlaps with a second PUSCH of the configured grant. The UE may transmit the second PUSCH based upon the configured grant.

20 Claims, 8 Drawing Sheets

METHOD AND APPARATUS FOR UPLINK GRANT OVERRIDDEN IN A WIRELESS COMMUNICATION SYSTEM

CROSS-REFERENCE TO RELATED APPLICATIONS

The present application claims the benefit of U.S. Provisional Patent Application Ser. No. 62/931,439 filed on Nov. 6, 2019, the entire disclosure of which is incorporated herein in its entirety by reference.

FIELD

This disclosure generally relates to wireless communication networks, and more particularly, to a method and apparatus for uplink grant overridden in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE may receive a configured grant. The UE may receive a Random Access Response (RAR) grant, wherein a first Physical Uplink Shared Channel (PUSCH) of the RAR grant overlaps with a second PUSCH of the configured grant. The UE may transmit the second PUSCH based upon the configured grant.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.211 V15.7.0, "NR physical channels and modulation"; 3GPP TS 38.214 V15.7.0, "NR Physical layer procedures for data"; 3GPP TS 38.321 V15.7.0, "NR MAC protocol specification"; 3GPP TS 38.213 V15.7.0, "NR Physical layer procedures for control". The standards and documents listed above are hereby expressly incorporated by reference in their entirety.

Figure 1:
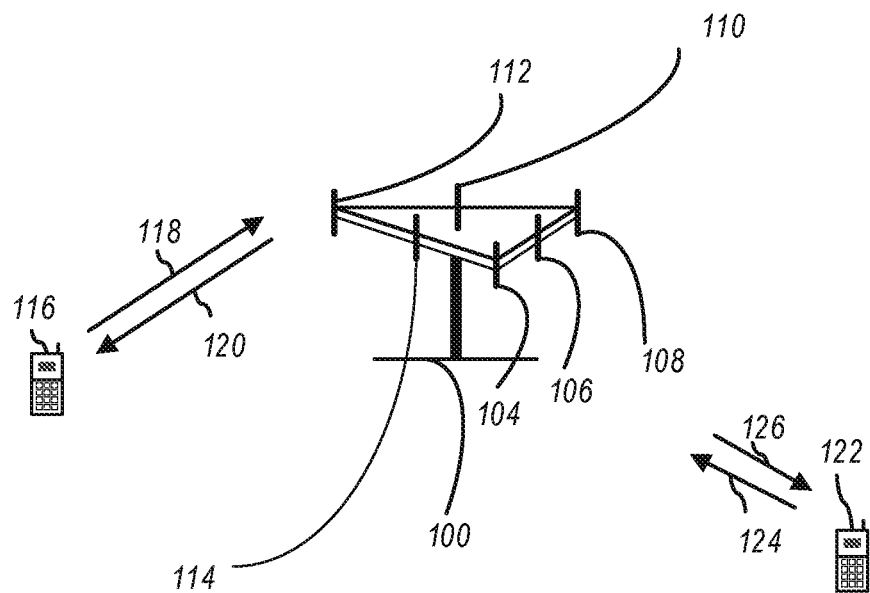
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
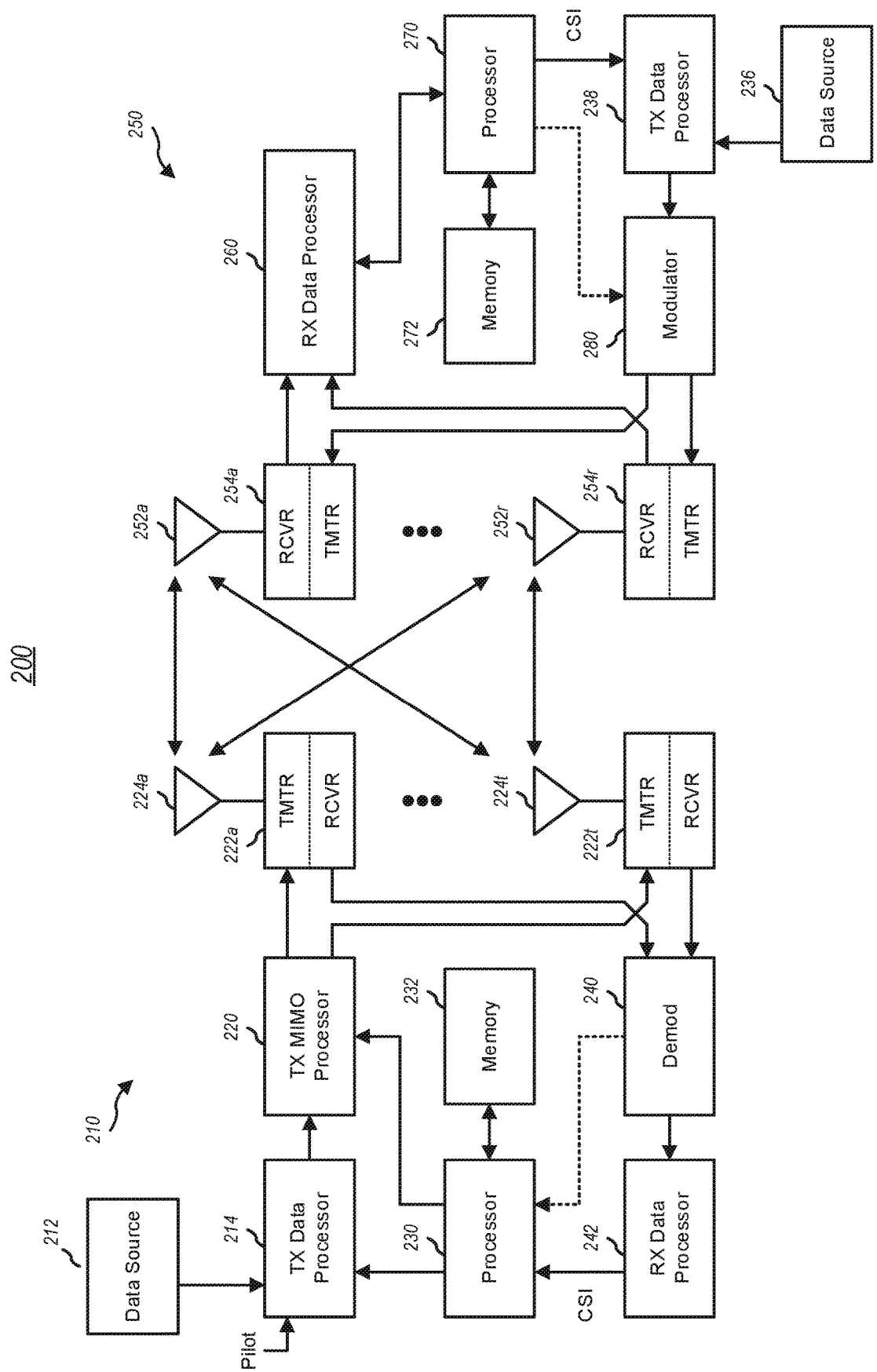
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
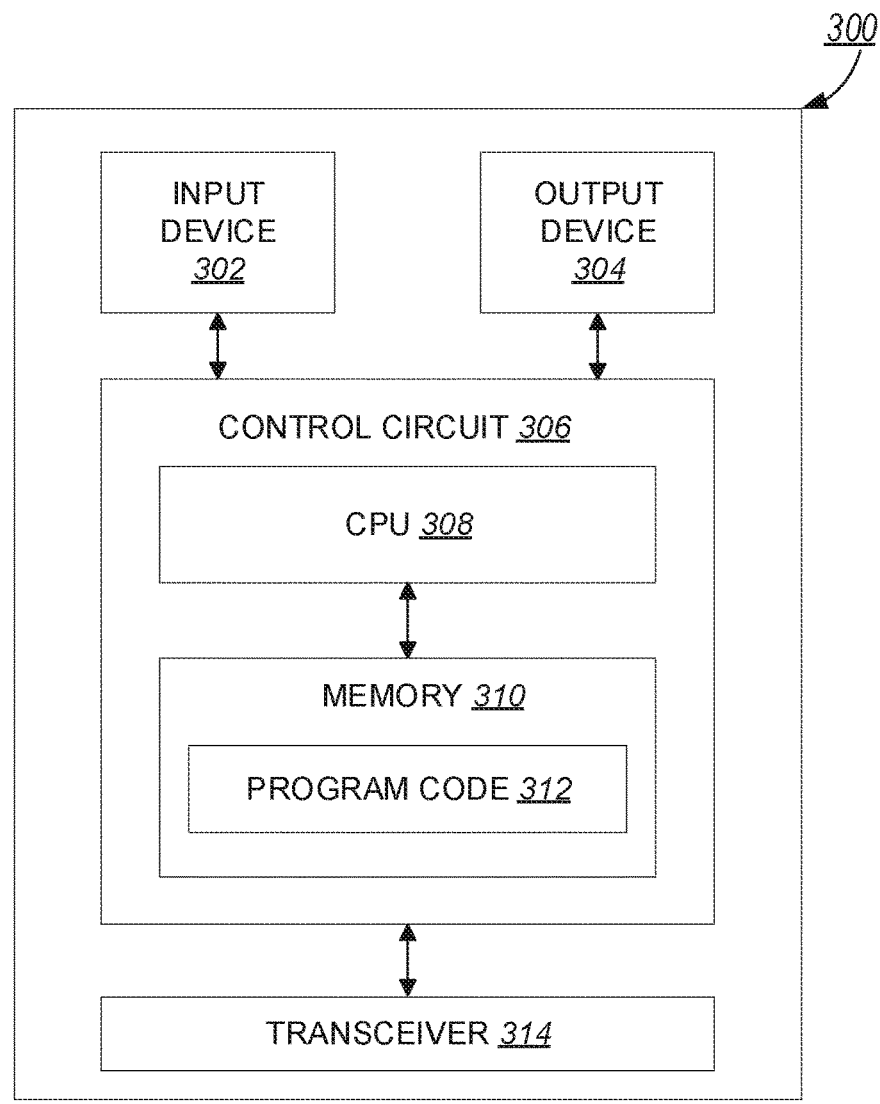
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
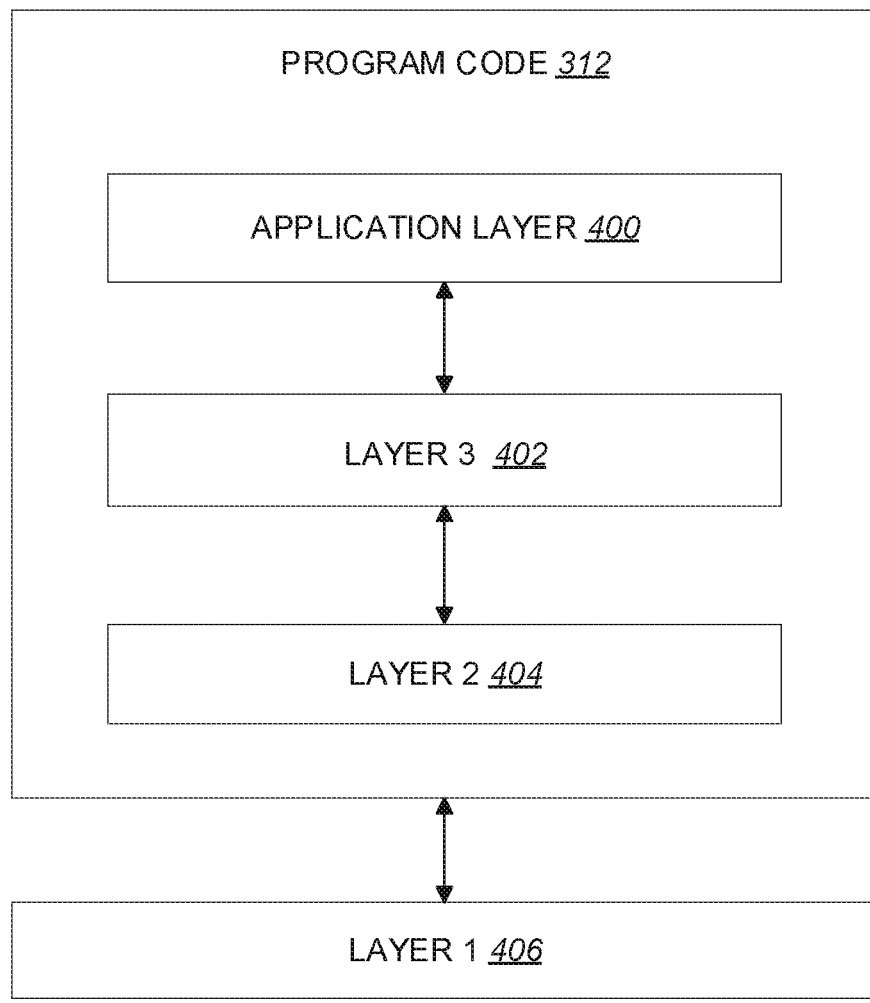
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Frame structure used in New RAT (NR) for 5G is studied to accommodate various types of requirements for time and frequency resources, e.g., from ultra-low latency (~0.5 milliseconds) to delay-tolerant traffic for Machine Type Communications (MTC), from high peak rate for enhanced Mobile Broadband (eMBB) to very low data rate for MTC. An important focus of this study is low latency aspect, e.g., short Transmission Time Interval (TTI), while other aspects of mixing and/or adapting different TTIs can also be considered in the study. In addition to diverse services and requirements, forward compatibility may be an important consideration in initial NR frame structure design as not all features of NR may be included in the beginning phase/release.

Reducing latency of protocol is an important improvement between different generations/releases, which can improve efficiency as well as meet new application requirements, e.g., real-time service. An effective method frequently adopted to reduce latency is to reduce the length of TTIs, such as from 10 milliseconds in 3G to 1 millisecond in LTE.

Figure 5:
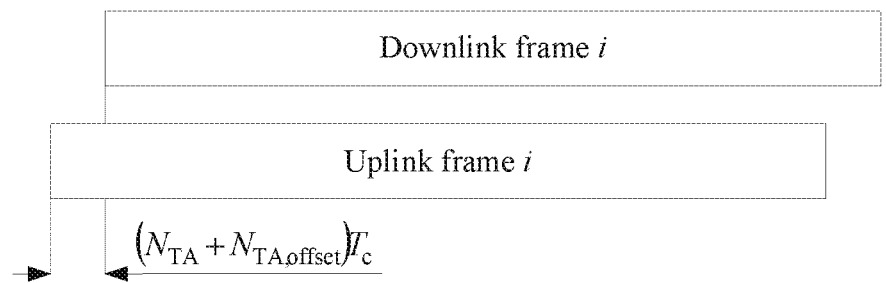
FIG. 5 is a diagram illustrating uplink-downlink timing relation according to one exemplary embodiment.

NR may be different, as backward compatibility may not be required. Numerology can be adjusted such that reducing a symbol number of a TTI would not be the only tool to change TTI length. Using LTE numerology as an example, it comprises 14 OFDM symbol in 1 millisecond and a subcarrier spacing of 15 KHz. When the subcarrier spacing is 30 KHz, under the assumption of a same FFT size and a same CP structure, there would be 28 OFDM symbols in 1 millisecond, and the TTI becomes 0.5 milliseconds if the number of OFDM symbols in a TTI is kept the same. This implies the design between different TTI lengths can be kept common, with good scalability performed on the subcarrier spacing. There may be trade-offs for subcarrier spacing selection, e.g., Fast Fourier Transform (FFT) size, definition/number of Physical Resource Blocks (PRBs), the design of Cyclic Prefix (CP), supportable system bandwidth, etc. As larger system bandwidth and larger coherence bandwidth is considered for NR, inclusion of a larger subcarrier spacing may be a natural choice. More details of NR frame structure, channel design and numerology design are provided in 3GPP TS 38.211 V15.7.0. Parts of 3GPP TS 38.211 V15.7.0 are quoted below. Notably, FIG. 4.3.1-1 of Section 4.3.1 of 3GPP TS 38.211 V15.7.0, entitled "Uplink-downlink timing relation", is reproduced herein as FIG. 5.

4 Frame Structure and Physical Resources

4.1 General

Throughout this specification, unless otherwise noted, the size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta_{ref} \cdot N_{f,ref})$, $\Delta f_{ref}=15 \cdot 10^3$ Hz and $N_{f,ref}=2048$.

4.2 Numerologies

Multiple OFDM numerologies are supported as given by Table 4.2-1 where μ and the cyclic prefix for a bandwidth part are obtained from the higher-layer parameter subcarrierSpacing and cyclicPrefix, respectively.

TABLE 4.2-1

Supported transmission numerologies.

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

4.3 Frame Structure

4.3.1 Frames and Subframes

Downlink and uplink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $T_{TA}=(N_{TA}+N_{TA,\,offset})T_c$ before the start of the corresponding downlink frame at the UE where $N_{TA,\,offset}$ is given by [5, TS 38.213].

FIG. 4.3.1-1: Uplink-Downlink Timing Relation

4.3.2 Slots

For subcarrier spacing configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.

OFDM symbols in a slot can be classified as 'downlink', 'flexible', or 'uplink'. Signaling of slot formats is described in subclause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

TABLE 4.3.2-1

Number of OFDM symbols per slot, slots per frame, and slots per subframe for normal cyclic prefix.

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4.3.2-2

Number of OFDM symbols per slot, slots per frame, and slots per subframe for extended cyclic prefix.

| μ | $N_{symb}^{slot}$ | $N_{slot}^{frame,\mu}$ | $N_{slot}^{subframe,\mu}$ |
|---|---|---|---|
| 2 | 12 | 40 | 4 |

TABLE 4.3.2-3

Transition time $N_{Rx-Tx}$ and $N_{Tx-Rx}$

| Transition time | FR1 | FR2 |
|---|---|---|
| $N_{Tx-Rx}$ | 25600 | 13792 |
| $N_{Rx-Tx}$ | 25600 | 13792 |

An uplink (UL) grant from a base station may be required for a UE to transmit data to the base station. There may be several types of uplink grants. One type of uplink grant is a dynamic uplink grant, e.g., an uplink grant signaled by a Physical Downlink Control Channel (PDCCH). PDCCH indicating dynamic grant may be for a specific UE and may be Cyclic Redundancy Checksum (CRC)-scrambled with an ID of the UE, e.g., Cell Radio Network Temporary Identifier (C-RNTI). In some examples, a dynamic uplink grant is a one-time allocation, e.g., an allocated resource is available in one or more indicated slots. Another type of uplink grant is a configured grant. The configured grant may be configured by Radio Resource Control (RRC), and may be periodically available for uplink. The configured grant may be for a specific UE. An activation by a L1 signaling, e.g., PDCCH, may be used to initiate a configured grant, e.g., a configured grant type 2. An L1 signal activating a configured grant may be scrambled with an ID of a UE, e.g., Configured Scheduling Radio Network Temporary Identifier (CS-RNTI). The PDCCH activating the configured grant may carry some further information, e.g., time domain resource allocation, frequency domain resource allocation, and/or other relevant information for the configured grant. For a configured grant with L1 signal activation, an initial Physical Uplink Shared Channel (PUSCH) may be scheduled by the L1 signal (e.g., PDCCH), and a PUSCH following the initial PUSCH may be scheduled without an associated PDCCH. Alternatively and/or additionally, a configured grant may be available once configured, e.g., without activation. Some and/or all relevant information may be configured by RRC for the configured grant, e.g., a configured grant type 1. Another type of uplink grant is a Random Access Response (RAR) grant. This grant is used during a random access procedure. A RAR grant would be associated with one or more preamble resources (e.g., time and/or frequency domain resource) and/or a preamble sequence (e.g., code domain resource). After transmitting a preamble, the UE may try to decode PDCCH with an ID, e.g. Random Access Radio Network Temporary Identifier (RA-RNTI), wherein the ID is associated with a resource (time and/or frequency resource) used to transmit the preamble. If a PDCCH corresponding to the ID is decoded, the UE may further decode a Physical Downlink Shared Channel (PDSCH) scheduled by the PDCCH. The PDSCH may comprise one or more RARs. A RAR (and/or each RAR) in the PDSCH may comprise an uplink grant and its associated preamble ID. If one RAR comprises preamble ID identical to a preamble ID of a preamble sequence which is used to perform preamble transmission by a UE, the UE may consider the RAR is for itself and use the uplink grant to perform PUSCH transmission. However, since a preamble sequence could be dedicated for a UE or selected by more than one UE, the uplink grant may be for a plurality of UEs. When more than one uplink grant is available for a serving cell and the resources allocated by the more than one uplink grant overlap, the UE may need to determine which uplink grant should be used to perform PUSCH transmission. This is because the UE may be unable to perform two PUSCH transmissions on the same symbol on the same serving cell. When a PUSCH is scheduled by a PDCCH or RAR, and the PUSCH overlaps with a configured grant PUSCH (e.g., a PUSCH scheduled based on configuration without a corresponding PDCCH), the UE may transmit the PUSCH and may not transmit the configured grant PUSCH. This is known as configured grant overridden. A dynamic grant or a RAR grant may override a configured grant. For dealing with override between a configured grant and a dynamic grant, a processing timeline may be defined. A dynamic grant would override a configured grant if the dynamic grant is transmitted sufficiently early. For example, a dynamic grant may override a configured grant if a last symbol of a PDCCH carrying the dynamic grant is at least $N_2$ symbols before a start symbol of a PUSCH based upon the configured grant when scheduled resource of the dynamic grant overlaps resource of the configured grant. The UE may not expect that a dynamic grant would schedule resource overlap with a configured grant (in time domain) if a last symbol of a PDCCH carrying the dynamic grant is not at least $N_2$ symbol before a start symbol of a PUSCH based upon the configured grant. In other words, a base station may ensure an overriding dynamic grant is transmitted sufficiently early before an overridden configured grant. A base station may ensure a following case would not occur: a dynamic grant schedule resource overlaps with a configured grant (in time domain) and a last symbol of a PDCCH carrying the dynamic grant is not at least $N_2$ symbols before a start symbol of a PUSCH based upon the configured grant. UE behavior in this case is not specified. A base station should ensure resources scheduled by a dynamic grant which is not transmitted sufficiently early before a configured grant would not overlap with resources of the configured grant (in time domain). More details may be found in 3GPP TS 38.214 V15.7.0 and 3GPP TS 38.321 V15.7.0. Parts of 3GPP TS 38.214 V15.7.0 are quoted below:

6 Physical Uplink Shared Channel Related Procedure 6.1 UE Procedure for Transmitting the Physical Uplink Shared Channel PUSCH transmission(s) can be dynamically scheduled by an UL grant in a DCI, or the transmission can correspond to a configured grant Type 1 or Type 2. The configured grant Type 1 PUSCH transmission is semi-statically configured to operate upon the reception of higher layer parameter of configuredGrantConfig including rrc-ConfiguredUplinkGrant without the detection of an UL grant in a DCI. The configured grant Type 2 PUSCH transmission is semi-persistently scheduled by an UL grant in a valid activation DCI according to Subclause 10.2 of [6, TS 38.213] after the reception of higher layer parameter configuredGrantConfig not including rrc-ConfiguredUplinkGrant.

For the PUSCH transmission corresponding to a configured grant, the parameters applied for the transmission are provided by configuredGrantConfig except for dataScramblingIdentityPUSCH, txConfig, codebookSubset, maxRank, scaling of UCI-OnPUSCH, which are provided by puschConfig. If the UE is provided with transformPrecoder in configuredGrantConfig, the UE applies the higher layer parameter tp-pi2BPSK, if provided in pusch-Config, according to the procedure described in Subclause 6.1.4 for the PUSCH transmission corresponding to a configured grant.

For the PUSCH retransmission scheduled by a PDCCH with CRC scrambled by CS-RNTI with NDI=1, the parameters in pusch-Config are applied for the PUSCH transmission except for p0-NominalWithoutGrant, p0-PUSCH-Alpha, powerControlLoopToUse, pathlossReferenceIndex described in Subclause 7.1 of [6, TS 38.213], mcs-Table, mcs-TableTransformPrecoder described in Subclause 6.1.4.1 and transformPrecoder described in Subclause 6.1.3.

For a UE configured with two uplinks in a serving cell, PUSCH retransmission for a TB on the serving cell is not expected to be on a different uplink than the uplink used for the PUSCH initial transmission of that TB.

A UE shall upon detection of a PDCCH with a configured DCI format 0_0 or 0_1 transmit the corresponding PUSCH as indicated by that DCI. Upon detection of a DCI format 0_1 with "UL-SCH indicator" set to "0" and with a non-zero "CSI request" where the associated "reportQuantity" in CSI-ReportConfig set to "none" for all CSI report(s) triggered by "CSI request" in this DCI format 0_1, the UE ignores all fields in this DCI except the "CSI request" and the UE shall not transmit the corresponding PUSCH as indicated by this DCI format 0_1. For any HARQ process ID(s) in a given scheduled cell, the UE is not expected to transmit a PUSCH that overlaps in time with another PUSCH. For any two HARQ process IDs in a given scheduled cell, if the UE is scheduled to start a first PUSCH transmission starting in symbol j by a PDCCH ending in symbol i, the UE is not expected to be scheduled to transmit a PUSCH starting earlier than the end of the first PUSCH by a PDCCH that ends later than symbol i. The UE is not expected to be scheduled to transmit another PUSCH by DCI format 0_0 or 0_1 scrambled by C-RNTI or MCS-C-RNTI for a given HARQ process until after the end of the expected transmission of the last PUSCH for that HARQ process.

A UE is not expected to be scheduled by a PDCCH ending in symbol i to transmit a PUSCH on a given serving cell overlapping in time with a transmission occasion, where the UE is allowed to transmit a PUSCH with configured grant according to [10, TS38.321], starting in a symbol j on the same serving cell if the end of symbol i is not at least $N_2$ symbols before the beginning of symbol j. The value $N_2$ in symbols is determined according to the UE processing capability defined in Subclause 6.4, and $N_2$ and the symbol duration are based on the minimum of the subcarrier spacing corresponding to the PUSCH with configured grant and the subcarrier spacing of the PDCCH scheduling the PUSCH.

A UE is not expected to be scheduled by a PDCCH ending in symbol i to transmit a PUSCH on a given serving cell for a given HARQ process, if there is a transmission occasion where the UE is allowed to transmit a PUSCH with configured grant according to [10, TS38.321] with the same HARQ process on the same serving cell starting in a symbol j after symbol i, and if the gap between the end of PDCCH and the beginning of symbol j is less than $N_2$ symbols. The value $N_2$ in symbols is determined according to the UE processing capability defined in Subclause 6.4, and $N_2$ and the symbol duration are based on the minimum of the subcarrier spacing corresponding to the PUSCH with configured grant and the subcarrier spacing of the PDCCH scheduling the PUSCH.

For PUSCH scheduled by DCI format 0_0 on a cell, the UE shall transmit PUSCH according to the spatial relation, if applicable, corresponding to the dedicated PUCCH resource with the lowest ID within the active UL BWP of the cell, as described in Subclause 9.2.1 of [6, TS 38.213].

For uplink, 16 HARQ processes per cell is supported by the UE.

< . . . >

6.1.2 Resource Allocation

6.1.2.1 Resource Allocation in Time Domain

When the UE is scheduled to transmit a transport block and no CSI report, or the UE is scheduled to transmit a transport block and a CSI report(s) on PUSCH by a DCI, the Time domain resource assignment field value m of the DCI provides a row index m+1 to an allocated table. The determination of the used resource allocation table is defined in Subclause 6.1.2.1.1. The indexed row defines the slot offset $K_2$, the start and length indicator SLIV, or directly the start symbol S and the allocation length L, and the PUSCH mapping type to be applied in the PUSCH transmission.

When the UE is scheduled to transmit a PUSCH with no transport block and with a CSI report(s) by a CSI request field on a DCI, the Time-domain resource assignment field value m of the DCI provides a row index m+1 to an allocated table which is defined by the higher layer configured pusch-TimeDomainAllocationList in pusch-Config. The indexed row defines the start and length indicator SLIV, and the PUSCH mapping type to be applied in the PUSCH transmission and the $K_2$ value is determined as $K_2 = \max Y_j(m+1)$, where $Y_j$, $j=0, \ldots, N_{Rep}-1$ are the corresponding list entries of the higher layer parameter reportSlotOffsetList in CSI-ReportConfig for the $N_{Rep}$ triggered CSI Reporting Settings and $Y_j(m+1)$ is the (m+1)th entry of $Y_j$.

The slot where the UE shall transmit the PUSCH is determined by $K_2$ as $$\left\lfloor n \cdot \frac{2^{\mu_{PUSCH}}}{2^{\mu_{PDCCH}}} \right\rfloor + K_2$$

where n is the slot with the scheduling DCI, $K_2$ is based on the numerology of PUSCH, and $\mu_{PUSCH}$ and $\mu_{PDCCH}$ are the subcarrier spacing configurations for PUSCH and PDCCH, respectively, and The starting symbol S relative to the start of the slot, and the number of consecutive symbols L counting from the symbol S allocated for the PUSCH are determined from the start and length indicator SLIV of the indexed row:
if (L−1)≤7 then

SLIV=14·(L−1)+S else

SLIV=14·(14−L+1)+(14−1−S)

where 0<L≤14−S, and

The PUSCH mapping type is set to Type A or Type B as defined in Subclause 6.4.1.1.3 of [4, TS 38.211] as given by the indexed row.

The UE shall consider the S and L combinations defined in table 6.1.2.1-1 as valid PUSCH allocations

TABLE 6.1.2.1-1

| PUSCH mapping type | Valid S and L combinations | | | | | |
|---|---|---|---|---|---|---|
| | Normal cyclic prefix | | | Extended cyclic prefix | | |
| | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 11} | {1, . . . , 12} | {1, . . . , 12} |

When transmitting PUSCH scheduled by DCI format 0_1 in PDCCH with CRC scrambled with C-RNTI, MCS-C-RNTI, or CS-RNTI with NDI=1, if the UE is configured with pusch-AggregationFactor, the same symbol allocation is applied across the pusch-AggregationFactor consecutive slots and the PUSCH is limited to a single transmission layer. The UE shall repeat the TB across the pusch-AggregationFactor consecutive slots applying the same symbol allocation in each slot. The redundancy version to be applied on the nth transmission occasion of the TB, where n=0, 1, ... pusch-AggregationFactor−1, is determined according to table 6.1.2.1-2.

TABLE 6.1.2.1-2

Redundancy version when pusch-AggregationFactor is present

| $rv_{id}$ indicated by the DCI scheduling the PUSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

A PUSCH transmission in a slot of a multi-slot PUSCH transmission is omitted according to the conditions in Subclause 11.1 of [6, TS38.213].

6.1.2.1.1 Determination of the Resource Allocation Table to be Used for PUSCH Table 6.1.2.1.1-1 defines which PUSCH time domain resource allocation configuration to apply. Either a default PUSCH time domain allocation A according to table 6.1.2.1.1-2, is applied, or the higher layer configured pusch-TimeDomainAllocationList in either pusch-ConfigCommon or pusch-Config is applied.

Table 6.1.2.1.1-4 defines the subcarrier spacing specific values j. j is used in determination of $K_2$ in conjunction to table 6.1.2.1.1-2, for normal CP or table 6.1.2.1.1.-3 for extended CP, where $\mu_{PUSCH}$ is the subcarrier spacing configurations for PUSCH.

Table 6.1.2.1.1-5 defines the additional subcarrier spacing specific slot delay value for the first transmission of PUSCH scheduled by the RAR. When the UE transmits a PUSCH scheduled by RAR, the A value specific to the PUSCH subcarrier spacing $\mu_{PUSCH}$ is applied in addition to the $K_2$ value.

TABLE 6.1.2.1.1-1

Applicable PUSCH time domain resource allocation

| RNTI | PDCCH search space | pusch-ConfigCommon includes pusch-TimeDomainAllocationList | pusch-Config includes pusch-TimeDomainAllocationList | PUSCH time domain resource allocation to apply |
|---|---|---|---|---|
| PUSCH scheduled by MAC RAR as described in subclause 8.2 of [6, TS 38.213] | | No | — | Default A |
| | | Yes | | pusch-TimeDomainAllocationList provided in pusch-ConfigCommon |
| C-RNTI, MCS-C-RNTI, TC-RNTI, CS-RNTI | Any common search space associated with CORESET 0 | No | — | Default A |
| | | Yes | | pusch-AlloTimeDomaincationList provided in pusch-ConfigCommon |
| C-RNTI, MCS-C-RNTI, TC-RNTI, CS-RNTI, UE SP-CSI-RNTI | Any common search space not associated with CORESET 0, UE specific search space | No | No | Default A |
| | | Yes | No | pusch-TimeDomainAllocationList provided in pusch-ConfigCommon |
| | | No/Yes | Yes | pusch-TimeDomainAllocationList provided in pusch-Config |

TABLE 6.1.2.1.1-2

Default PUSCH time domain resource allocation A for normal CP

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 6.1.2.1.1-3

Default PUSCH time domain resource allocation A for extended CP

| Row index | PUSCH mapping type | $K_2$ | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 2 | 10 |
| 5 | Type B | j | 4 | 4 |
| 6 | Type B | j | 4 | 8 |
| 7 | Type B | j | 4 | 6 |
| 8 | Type A | j + 1 | 0 | 8 |
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 |

TABLE 6.1.2.1.1-4

Definition of value j

| $\mu_{PUSCH}$ | j |
|---|---|
| 0 | 1 |
| 1 | 1 |
| 2 | 2 |
| 3 | 3 |

TABLE 6.1.2.1.1-5

Definition of value $\Delta$

| $\mu_{PUSCH}$ | $\Delta$ |
|---|---|
| 0 | 2 |
| 1 | 3 |
| 2 | 4 |
| 3 | 6 |

< . . . >

6.1.2.3.1 Transport Block Repetition for Uplink Transmissions with a Configured Grant The higher layer configured parameters repK and repK-RV define the K repetitions to be applied to the transmitted transport block, and the redundancy version pattern to be applied to the repetitions. If the parameter repK-RV is not provided in the configuredGrantConfig, the redundancy version for uplink transmissions with a configured grant shall be set to 0. Otherwise, for the nth transmission occasion among K repetitions, n=1, 2, . . . , K, it is associated with $(mod(n-1,4)+1)^{th}$ value in the configured RV sequence. The initial transmission of a transport block may start at the first transmission occasion of the K repetitions if the configured RV sequence is {0,2,3,1}, any of the transmission occasions of the K repetitions that are associated with RV=0 if the configured RV sequence is {0,3,0,3}, any of the transmission occasions of the K repetitions if the configured RV sequence is {0,0,0,0}, except the last transmission occasion when K=8.

For any RV sequence, the repetitions shall be terminated after transmitting K repetitions, or at the last transmission occasion among the K repetitions within the period P, or from the starting symbol of the repetition that overlaps with a PUSCH with the same HARQ process scheduled by DCI format 0_0 or 0_1, whichever is reached first. The UE is not expected to be configured with the time duration for the transmission of K repetitions larger than the time duration derived by the periodicity P. If the UE determines that, for a transmission occasion, the number of symbols available for the PUSCH transmission in a slot is smaller than transmission duration L, the UE does not transmit the PUSCH in the transmission occasion.

For both Type 1 and Type 2 PUSCH transmissions with a configured grant, when the UE is configured with repK>1, the UE shall repeat the TB across the repK consecutive slots applying the same symbol allocation in each slot. A Type 1 or Type 2 PUSCH transmission with a configured grant in a slot is omitted according to the conditions in Subclause 11.1 of [6, TS38.213].

< . . . >

6.4 UE PUSCH Preparation Procedure Time

If the first uplink symbol in the PUSCH allocation for a transport block, including the DM-RS, as defined by the slot offset $K_2$ and the start and length indicator SLIV of the scheduling DCI and including the effect of the timing advance, is no earlier than at symbol $L_2$, where L2 is defined as the next uplink symbol with its CP starting $T_{proc,2} = \max((N_2+d_{2,1})(2048+144)\cdot\kappa 2^{-\mu}\cdot T_c, d_{2,2})$ after the end of the reception of the last symbol of the PDCCH carrying the DCI scheduling the PUSCH, then the UE shall transmit the transport block.

$N_2$ is based on μ of Table 6.4-1 and Table 6.4-2 for UE processing capability 1 and 2 respectively, where μ corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and κ is defined in subclause 4.1 of [4, TS 38.211].

If the first symbol of the PUSCH allocation consists of DM-RS only, then $d_{2,1}=0$, otherwise $d_{2,1}=1$.

If the UE is configured with multiple active component carriers, the first uplink symbol in the PUSCH allocation further includes the effect of timing difference between component carriers as given in [11, TS 38.133].

If the scheduling DCI triggered a switch of BWP, $d_{2,2}$ equals to the switching time as defined in [11, TS 38.133], otherwise $d_{2,2}=0$.

For a UE that supports capability 2 on a given cell, the processing time according to UE processing capability 2 is applied if the high layer parameter processingType2Enabled in PUSCH-ServingCellConfig is configured for the cell and set to enable, If the PUSCH indicated by the DCI is overlapping with one or more PUCCH channels, then the transport block is multiplexed following the procedure in subclause 9.2.5 of [9, TS 38.213], otherwise the transport block is transmitted on the PUSCH indicated by the DCI.

Otherwise the UE may ignore the scheduling DCI.

The value of $T_{proc,2}$ is used both in the case of normal and extended cyclic prefix.

TABLE 6.4-1

PUSCH preparation time for PUSCH timing capability 1

| μ | PUSCH preparation time $N_2$ [symbols] |
|---|---|
| 0 | 10 |
| 1 | 12 |
| 2 | 23 |
| 3 | 36 |

TABLE 6.4-2

PUSCH preparation time for PUSCH timing capability 2

| μ | PUSCH preparation time $N_2$ [symbols] |
|---|---|
| 0 | 5 |
| 1 | 5.5 |
| 2 | 11 for frequency range 1 |

Parts of 3GPP TS 38.321 V15.7.0 are quoted below:

5.4 UL-SCH Data Transfer 5.4.1 UL Grant Reception

Uplink grant is either received dynamically on the PDCCH, in a Random Access Response, or configured semi-persistently by RRC. The MAC entity shall have an uplink grant to transmit on the UL-SCH. To perform the requested transmissions, the MAC layer receives HARQ information from lower layers.

If the MAC entity has a C-RNTI, a Temporary C-RNTI, or CS-RNTI, the MAC entity shall for each PDCCH occasion and for each Serving Cell belonging to a TAG that has a running timeAlignmentTimer and for each grant received for this PDCCH occasion:

1> if an uplink grant for this Serving Cell has been received on the PDCCH for the MAC entity's C-RNTI or Temporary C-RNTI; or
1> if an uplink grant has been received in a Random Access Response:
  2> if the uplink grant is for MAC entity's C-RNTI and if the previous uplink grant delivered to the HARQ entity for the same HARQ process was either an uplink grant received for the MAC entity's CS-RNTI or a configured uplink grant:
    3> consider the NDI to have been toggled for the corresponding HARQ process regardless of the value of the NDI.
  2> if the uplink grant is for MAC entity's C-RNTI, and the identified HARQ process is configured for a configured uplink grant:
    3> start or restart the configuredGrantTimer for the corresponding HARQ process, if configured.
  2> deliver the uplink grant and the associated HARQ information to the HARQ entity.
1> else if an uplink grant for this PDCCH occasion has been received for this Serving Cell on the PDCCH for the MAC entity's CS-RNTI:
  2> if the NDI in the received HARQ information is 1:
    3> consider the NDI for the corresponding HARQ process not to have been toggled;
    3> start or restart the configuredGrantTimer for the corresponding HARQ process, if configured;
    3> deliver the uplink grant and the associated HARQ information to the HARQ entity.
  2> else if the NDI in the received HARQ information is 0:
    3> if PDCCH contents indicate configured grant Type 2 deactivation:
      4> trigger configured uplink grant confirmation.
    3> else if PDCCH contents indicate configured grant Type 2 activation:
      4> trigger configured uplink grant confirmation;
      4> store the uplink grant for this Serving Cell and the associated HARQ information as configured uplink grant;
      4> initialise or re-initialise the configured uplink grant for this Serving Cell to start in the associated PUSCH duration and to recur according to rules in clause 5.8.2;
      4> stop the configuredGrantTimer for the corresponding HARQ process, if running;

For each Serving Cell and each configured uplink grant, if configured and activated, the MAC entity shall:

1> if the PUSCH duration of the configured uplink grant does not overlap with the PUSCH duration of an uplink grant received on the PDCCH or in a Random Access Response for this Serving Cell:
  2> set the HARQ Process ID to the HARQ Process ID associated with this PUSCH duration;
  2> if the configuredGrantTimer for the corresponding HARQ process is not running:

3> consider the NDI bit for the corresponding HARQ process to have been toggled;
3> deliver the configured uplink grant and the associated HARQ information to the HARQ entity.

For configured uplink grants, the HARQ Process ID associated with the first symbol of a UL transmission is derived from the following equation:

HARQ Process ID=[floor(CURRENT_symbol/periodicity)]modulo nrofHARQ-Processes where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211 [8].

NOTE 1: CURRENT_symbol refers to the symbol index of the first transmission occasion of a repetition bundle that takes place.

NOTE 2: A HARQ process is configured for a configured uplink grant if the configured uplink grant is activated and the associated HARQ process ID is less than nrofHARQ-Processes.

NOTE 3: If the MAC entity receives both a grant in a Random Access Response and an overlapping grant for its C-RNTI or CS-RNTI, requiring concurrent transmissions on the SpCell, the MAC entity may choose to continue with either the grant for its RA-RNTI or the grant for its C-RNTI or CS-RNTI.

5.4.2 HARQ Operation

5.4.2.1 HARQ Entity

The MAC entity includes a HARQ entity for each Serving Cell with configured uplink (including the case when it is configured with supplementary Uplink), which maintains a number of parallel HARQ processes.

The number of parallel UL HARQ processes per HARQ entity is specified in TS 38.214 [7].

Each HARQ process supports one TB.

Each HARQ process is associated with a HARQ process identifier. For UL transmission with UL grant in RA Response, HARQ process identifier 0 is used.

When the MAC entity is configured with pusch-AggregationFactor>1, the parameter pusch-AggregationFactor provides the number of transmissions of a TB within a bundle of the dynamic grant. After the initial transmission, pusch-AggregationFactor−1 HARQ retransmissions follow within a bundle. When the MAC entity is configured with repK>1, the parameter repK provides the number of transmissions of a TB within a bundle of the configured uplink grant. After the initial transmission, HARQ retransmissions follow within a bundle. For both dynamic grant and configured uplink grant, bundling operation relies on the HARQ entity for invoking the same HARQ process for each transmission that is part of the same bundle. Within a bundle, HARQ retransmissions are triggered without waiting for feedback from previous transmission according to pusch-AggregationFactor for a dynamic grant and repK for a configured uplink grant, respectively. Each transmission within a bundle is a separate uplink grant after the initial uplink grant within a bundle is delivered to the HARQ entity.

For each transmission within a bundle of the dynamic grant, the sequence of redundancy versions is determined according to clause 6.1.2.1 of TS 38.214 [7]. For each transmission within a bundle of the configured uplink grant, the sequence of redundancy versions is determined according to clause 6.1.2.3 of TS 38.214 [7].

For each uplink grant, the HARQ entity shall:
1> identify the HARQ process associated with this grant, and for each identified HARQ process:
2> if the received grant was not addressed to a Temporary C-RNTI on PDCCH, and the NDI provided in the associated HARQ information has been toggled compared to the value in the previous transmission of this TB of this HARQ process; or
2> if the uplink grant was received on PDCCH for the C-RNTI and the HARQ buffer of the identified process is empty; or
2> if the uplink grant was received in a Random Access Response; or
2> if the uplink grant was received on PDCCH for the C-RNTI in ra-Response Window and this PDCCH successfully completed the Random Access procedure initiated for beam failure recovery; or
2> if the uplink grant is part of a bundle of the configured uplink grant, and may be used for initial transmission according to clause 6.1.2.3 of TS 38.214 [7], and if no MAC PDU has been obtained for this bundle:
3> if there is a MAC PDU in the Msg3 buffer and the uplink grant was received in a Random Access Response; or:
3> if there is a MAC PDU in the Msg3 buffer and the uplink grant was received on PDCCH for the C-RNTI in ra-Response Window and this PDCCH successfully completed the Random Access procedure initiated for beam failure recovery:
4> obtain the MAC PDU to transmit from the Msg3 buffer.
4> if the uplink grant size does not match with size of the obtained MAC PDU; and
4> if the Random Access procedure was successfully completed upon receiving the uplink grant:
5> indicate to the Multiplexing and assembly entity to include MAC subPDU(s) carrying MAC SDU from the obtained MAC PDU in the subsequent uplink transmission;
5> obtain the MAC PDU to transmit from the Multiplexing and assembly entity.
3> else:
4> obtain the MAC PDU to transmit from the Multiplexing and assembly entity, if any;
3> if a MAC PDU to transmit has been obtained:
4> deliver the MAC PDU and the uplink grant and the HARQ information of the TB to the identified HARQ process;
4> instruct the identified HARQ process to trigger a new transmission;
4> if the uplink grant is addressed to CS-RNTI; or
4> if the uplink grant is a configured uplink grant; or
4> if the uplink grant is addressed to C-RNTI, and the identified HARQ process is configured for a configured uplink grant:
5> start or restart the configuredGrantTimer, if configured, for the corresponding HARQ process when the transmission is performed.

3> else:
    4> flush the HARQ buffer of the identified HARQ process.
2> else (i.e. retransmission):
    3> if the uplink grant received on PDCCH was addressed to CS-RNTI and if the HARQ buffer of the identified process is empty; or
    3> if the uplink grant is part of a bundle and if no MAC PDU has been obtained for this bundle; or
    3> if the uplink grant is part of a bundle of the configured uplink grant, and the PUSCH duration of the uplink grant overlaps with a PUSCH duration of another uplink grant received on the PDCCH or in a Random Access Response for this Serving Cell:
        4> ignore the uplink grant.
    3> else:
        4> deliver the uplink grant and the HARQ information (redundancy version) of the TB to the identified HARQ process;
        4> instruct the identified HARQ process to trigger a retransmission;
        4> if the uplink grant is addressed to CS-RNTI; or
        4> if the uplink grant is addressed to C-RNTI, and the identified HARQ process is configured for a configured uplink grant:
            5> start or restart the configuredGrantTimer, if configured, for the corresponding HARQ process when the transmission is performed.

When determining if NDI has been toggled compared to the value in the previous transmission the MAC entity shall ignore NDI received in all uplink grants on PDCCH for its Temporary C-RNTI.

5.4.2.2 HARQ Process

Each HARQ process is associated with a HARQ buffer.

New transmissions are performed on the resource and with the MCS indicated on either PDCCH, Random Access Response, or RRC. Retransmissions are performed on the resource and, if provided, with the MCS indicated on PDCCH, or on the same resource and with the same MCS as was used for last made transmission attempt within a bundle.

If the HARQ entity requests a new transmission for a TB, the HARQ process shall:
1> store the MAC PDU in the associated HARQ buffer;
1> store the uplink grant received from the HARQ entity;
1> generate a transmission as described below.

If the HARQ entity requests a retransmission for a TB, the HARQ process shall:
1> store the uplink grant received from the HARQ entity;
1> generate a transmission as described below.

To generate a transmission for a TB, the HARQ process shall:
1> if the MAC PDU was obtained from the Msg3 buffer; or
1> if there is no measurement gap at the time of the transmission and, in case of retransmission, the retransmission does not collide with a transmission for a MAC PDU obtained from the Msg3 buffer:
    2> instruct the physical layer to generate a transmission according to the stored uplink grant.
< . . . >

5.8.2 Uplink

There are two types of transmission without dynamic grant:
configured grant Type 1 where an uplink grant is provided by RRC, and stored as configured uplink grant;
configured grant Type 2 where an uplink grant is provided by PDCCH, and stored or cleared as configured uplink grant based on L1 signalling indicating configured uplink grant activation or deactivation.

Type 1 and Type 2 are configured by RRC per Serving Cell and per BWP. Multiple configurations can be active simultaneously only on different Serving Cells. For Type 2, activation and deactivation are independent among the Serving Cells. For the same Serving Cell, the MAC entity is configured with either Type 1 or Type 2.

RRC configures the following parameters when the configured grant Type 1 is configured:
cs-RNTI: CS-RNTI for retransmission;
periodicity: periodicity of the configured grant Type 1;
timeDomainOffset: Offset of a resource with respect to SFN=0 in time domain;
timeDomainAllocation: Allocation of configured uplink grant in time domain which contains startSymbolAndLength (i.e. SLIV in TS 38.214 [7]);
nrofHARQ-Processes: the number of HARQ processes for configured grant.

RRC configures the following parameters when the configured grant Type 2 is configured:
cs-RNTI: CS-RNTI for activation, deactivation, and retransmission;
periodicity: periodicity of the configured grant Type 2;
nrofHARQ-Processes: the number of HARQ processes for configured grant.

Upon configuration of a configured grant Type 1 for a Serving Cell by upper layers, the MAC entity shall:
1> store the uplink grant provided by upper layers as a configured uplink grant for the indicated Serving Cell;
1> initialise or re-initialise the configured uplink grant to start in the symbol according to timeDomainOffset and S (derived from SLIV as specified in TS 38.214 [7]), and to reoccur with periodicity.

After an uplink grant is configured for a configured grant Type 1, the MAC entity shall consider that the uplink grant recurs associated with each symbol for which:

$$[(SFN \times numberOfSlotsPerFrame \times numberOfSymbolsPerSlot) + (\text{slot number in the frame} \times numberOfSymbolsPerSlot) + \text{symbol number in the slot}] = (timeDomainOffset \times numberOfSymbolsPerSlot + S + N \times periodicity) \bmod (1024 \times numberOfSlotsPerFrame \times numberOfSymbolsPerSlot), \text{ for all } N >= 0.$$

After an uplink grant is configured for a configured grant Type 2, the MAC entity shall consider that the uplink grant recurs associated with each symbol for which:

$$[(SFN \times numberOfSlotsPerFrame \times numberOfSymbolsPerSlot) + (\text{slot number in the frame} \times numberOfSymbolsPerSlot) + \text{symbol number in the slot}] = [(SFN_{start\ time} \times numberOfSlotsPerFrame \times numberOfSymbolsPerSlot + slot_{start\ time} \times numberOfSymbolsPerSlot + symbol_{start\ time}) + N \times periodicity] \bmod (1024 \times numberOfSlotsPerFrame \times numberOfSymbolsPerSlot), \text{ for all } N >= 0.$$

where $SFN_{start\ time}$, $slot_{start\ time}$, and $symbol_{start\ time}$ are the SFN, slot, and symbol, respectively, of the first transmission opportunity of PUSCH where the configured uplink grant was (re-)initialised.

When a configured uplink grant is released by upper layers, all the corresponding configurations shall be released and all corresponding uplink grants shall be cleared.

The MAC entity shall:
1> if the configured uplink grant confirmation has been triggered and not cancelled; and
1> if the MAC entity has UL resources allocated for new transmission:
   2> instruct the Multiplexing and Assembly procedure to generate a Configured Grant Confirmation MAC CE as defined in clause 6.1.3.7;
   2> cancel the triggered configured uplink grant confirmation.

For a configured grant Type 2, the MAC entity shall clear the configured uplink grant immediately after first transmission of Configured Grant Confirmation MAC CE triggered by the configured uplink grant deactivation.

Retransmissions except for repetition of configured uplink grants use uplink grants addressed to CS-RNTI.

A PDSCH processing timeline is defined in parts of 3GPP TS 38.214 V15.7.0 that are quoted below:

5.3 UE PDSCH Processing Procedure Time

If the first uplink symbol of the PUCCH which carries the HARQ-ACK information, as defined by the assigned HARQ-ACK timing $K_1$ and the PUCCH resource to be used and including the effect of the timing advance, starts no earlier than at symbol $L_1$, where $L_1$ is defined as the next uplink symbol with its CP starting after $T_{proc,1}=(N_1+d_{1,1})(2048+144)\cdot\kappa 2^{-\mu}\cdot T_c$ after the end of the last symbol of the PDSCH carrying the TB being acknowledged, then the UE shall provide a valid HARQ-ACK message.

$N_1$ is based on $\mu$ of table 5.3-1 and table 5.3-2 for UE processing capability 1 and 2 respectively, where $\mu$ corresponds to the one of ($\mu_{PDCCH}$, $\mu_{PDSCH}$, $\mu_{UL}$) resulting with the largest $T_{proc,1}$ where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted, and $\kappa$ is defined in subclause 4.1 of [4, TS 38.211].

If the PDSCH DM-RS position $l_1$ for the additional DM-RS in Table 7.4.1.1.2-3 in subclause 7.4.1.1.2 of [4, TS 38.211] is $l_1=12$ then $N_{1,0}=14$ in Table 5.3-1, otherwise $N_{1,0}=13$.

If the UE is configured with multiple active component carriers, the first uplink symbol which carries the HARQ-ACK information further includes the effect of timing difference between the component carriers as given in [11, TS 38.133].

For the PDSCH mapping type A as given in subclause 7.4.1.1 of [4, TS 38.211]: if the last symbol of PDSCH is on the i-th symbol of the slot where i<7, then $d_{1,1}=7-i$, otherwise $d_{1,1}=0$ For UE processing capability 1: If the PDSCH is mapping type B as given in subclause 7.4.1.1 of [4, TS 38.211], and
   if the number of PDSCH symbols allocated is 7, then $d_{1,1}=0$,
   if the number of PDSCH symbols allocated is 4, then $d_{1,1}=3$
   if the number of PDSCH symbols allocated is 2, then $d_{1,1}=3+d$, where d is the number of overlapping symbols of the scheduling PDCCH and the scheduled PDSCH.

For UE processing capability 2: If the PDSCH is mapping type B as given in subclause 7.4.1.1 of [4, TS 38.211],
   if the number of PDSCH symbols allocated is 7, then $d_{1,1}=0$,
   if the number of PDSCH symbols allocated is 4, then $d_{1,1}$ is the number of overlapping symbols of the scheduling PDCCH and the scheduled PDSCH,
   if the number of PDSCH symbols allocated is 2,
      if the scheduling PDCCH was in a 3-symbol CORESET and the CORESET and the PDSCH had the same starting symbol, then $d_{1,1}=3$,
      otherwise $d_{1,1}$ is the number of overlapping symbols of the scheduling PDCCH and the scheduled PDSCH.

For UE processing capability 2 with scheduling limitation when $\mu_{PDSCH}=1$, if the scheduled RB allocation exceeds 136 RBs, the UE defaults to capability 1 processing time. The UE may skip decoding a number of PDSCHs with last symbol within 10 symbols before the start of a PDSCH that is scheduled to follow Capability 2, if any of those PDSCHs are scheduled with more than 136 RBs with 30 kHz SCS and following Capability 1 processing time.

For a UE that supports capability 2 on a given cell, the processing time according to UE processing capability 2 is applied if the high layer parameter processingType2Enabled in PDSCH-ServingCellConfig is configured for the cell and set to enable.

If this PUCCH resource is overlapping with another PUCCH or PUSCH resource, then HARQ-ACK is multiplexed following the procedure in subclause 9.2.5 of [9, TS 38.213], otherwise the HARQ-ACK message is transmitted on PUCCH.

Otherwise the UE may not provide a valid HARQ-ACK corresponding to the scheduled PDSCH. The value of $T_{proc,1}$ is used both in the case of normal and extended cyclic prefix.

TABLE 5.3-1

PDSCH processing time for PDSCH processing capability 1

| | PDSCH decoding time $N_1$ [symbols] | |
| --- | --- | --- |
| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

TABLE 5.3-2

PDSCH processing time for PDSCH processing capability 2

| $\mu$ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
| --- | --- |
| 0 | 3 |
| 1 | 4.5 |
| 2 | 9 for frequency range 1 |

Details of a random access procedure including scheduling delay for RAR are quoted below from 3GPP TS 38.213 V15.7.0:

8 Random Access Procedure

Prior to initiation of the physical random access procedure, Layer 1 receives from higher layers a set of SS/PBCH block indexes and provides to higher layers a corresponding set of RSRP measurements.

Prior to initiation of the physical random access procedure, Layer 1 receives the following information from the higher layers:
 Configuration of physical random access channel (PRACH) transmission parameters (PRACH preamble format, time resources, and frequency resources for PRACH transmission).
 Parameters for determining the root sequences and their cyclic shifts in the PRACH preamble sequence set (index to logical root sequence table, cyclic shift ($N_{cs}$) and set type (unrestricted, restricted set A, or restricted set B)).

From the physical layer perspective, the L1 random access procedure includes the transmission of random access preamble (Msg1) in a PRACH, random access response (RAR) message with a PDCCH/PDSCH (Msg2), and when applicable, the transmission of a PUSCH scheduled by a RAR UL grant, and PDSCH for contention resolution.

If a random access procedure is initiated by a PDCCH order to the UE, a PRACH transmission is with a same SCS as a PRACH transmission initiated by higher layers.

If a UE is configured with two UL carriers for a serving cell and the UE detects a PDCCH order, the UE uses the UL/SUL indicator field value from the detected PDCCH order to determine the UL carrier for the corresponding PRACH transmission.

< . . . >

8.2 Random Access Response

In response to a PRACH transmission, a UE attempts to detect a DCI format 1_0 with CRC scrambled by a corresponding RA-RNTI during a window controlled by higher layers [11, TS 38.321]. The window starts at the first symbol of the earliest CORESET the UE is configured to receive PDCCH for Type1-PDCCH CSS set, as defined in Subclause 10.1, that is at least one symbol, after the last symbol of the PRACH transmission, where the symbol duration corresponds to the SCS for Type1-PDCCH CSS set as defined in Subclause 10.1. The length of the window in number of slots, based on the SCS for Type1-PDCCH CSS set, is provided by ra-Response Window.

If the UE detects the DCI format 1_0 with CRC scrambled by the corresponding RA-RNTI and a transport block in a corresponding PDSCH within the window, the UE passes the transport block to higher layers. The higher layers parse the transport block for a random access preamble identity (RAPID) associated with the PRACH transmission. If the higher layers identify the RAPID in RAR message(s) of the transport block, the higher layers indicate an uplink grant to the physical layer. This is referred to as random access response (RAR) UL grant in the physical layer.

If the UE does not detect the DCI format 1_0 with CRC scrambled by the corresponding RA-RNTI within the window, or if the UE does not correctly receive the transport block in the corresponding PDSCH within the window, or if the higher layers do not identify the RAPID associated with the PRACH transmission from the UE, the higher layers can indicate to the physical layer to transmit a PRACH. If requested by higher layers, the UE is expected to transmit a PRACH no later than $N_{T,1}+0.75$ msec after the last symbol of the window, or the last symbol of the PDSCH reception, where $N_{T,1}$ is a time duration of $N_1$ symbols corresponding to a PDSCH processing time for UE processing capability 1 when additional PDSCH DM-RS is configured. For $\mu=0$, the UE assumes $N_{1,0}=14$ [6, TS 38.214].

If the UE detects a DCI format 1_0 with CRC scrambled by the corresponding RA-RNTI and receives a transport block in a corresponding PDSCH, the UE may assume same DM-RS antenna port quasi co-location properties, as described in [6, TS 38.214], as for a SS/PBCH block or a CSI-RS resource the UE used for PRACH association, as described in Subclause 8.1, regardless of whether or not the UE is provided TCI-State for the CORESET where the UE receives the PDCCH with the DCI format 1_0. If the UE attempts to detect the DCI format 1_0 with CRC scrambled by the corresponding RA-RNTI in response to a PRACH transmission initiated by a PDCCH order that triggers a contention-free random access procedure for the SpCell [11, TS 38.321], the UE may assume that the PDCCH that includes the DCI format 1_0 and the PDCCH order have same DM-RS antenna port quasi co-location properties. If the UE attempts to detect the DCI format 1_0 with CRC scrambled by the corresponding RA-RNTI in response to a PRACH transmission initiated by a PDCCH order that triggers a contention-free random access procedure for a secondary cell, the UE may assume the DM-RS antenna port quasi co-location properties of the CORESET associated with the Type1-PDCCH CSS set for receiving the PDCCH that includes the DCI format 1_0.

A RAR UL grant schedules a PUSCH transmission from the UE. The contents of the RAR UL grant, starting with the MSB and ending with the LSB, are given in Table 8.2-1.

8.3 PUSCH Scheduled by RAR UL Grant

An active UL BWP, as described in Subclause 12 and in [4, TS 38.211], for a PUSCH transmission scheduled by a RAR UL grant is indicated by higher layers. For determining the frequency domain resource allocation for the PUSCH transmission within the active UL BWP
 if the active UL BWP and the initial UL BWP have same SCS and same CP length and the active UL BWP includes all RBs of the initial UL BWP, or the active UL BWP is the initial UL BWP, the initial UL BWP is used
 else, the RB numbering starts from the first RB of the active UL BWP and the maximum number of RBs for frequency domain resource allocation equals the number of RBs in the initial UL BWP A SCS for the PUSCH transmission is provided by subcarrierSpacing in BWP-UplinkCommon. A UE transmits PRACH and the PUSCH on a same uplink carrier of a same serving cell.

A UE transmits a transport block in a PUSCH scheduled by a RAR UL grant in a corresponding RAR message using redundancy version number 0. If a TC-RNTI is provided by higher layers, the scrambling initialization of the PUSCH corresponding to the RAR UL grant in clause 8.2 is by TC-RNTI. Otherwise, the scrambling initialization of the PUSCH corresponding to the RAR UL grant in clause 8.2 is by C-RNTI. Msg3 PUSCH retransmissions, if any, of the transport block, are scheduled by a DCI format 0_0 with CRC scrambled by a TC-RNTI provided in the corresponding RAR message [11, TS 38.321]. The UE always transmits the PUSCH scheduled by a RAR UL grant without repetitions.

With reference to slots for a PUSCH transmission scheduled by a RAR UL grant, if a UE receives a PDSCH with a RAR message ending in slot n for a corresponding PRACH transmission from the UE, the UE transmits the PUSCH in slot $n+k_2+\Delta$, where $k_2$ and $\Delta$ are provided in [6, TS 38.214].

The UE may assume a minimum time between the last symbol of a PDSCH reception conveying a RAR message with a RAR UL grant and the first symbol of a corresponding PUSCH transmission scheduled by the RAR UL grant is equal to $N_{T,1}+N_{T,2}+0.5$ msec, where $N_{T,1}$ is a time duration of $N_1$ symbols corresponding to a PDSCH processing time for UE processing capability 1 when additional PDSCH DM-RS is configured, $N_{T,2}$ is a time duration of $N_2$ symbols corresponding to a PUSCH preparation time for UE processing capability 1 [6, TS 38.214] and, for determining the minimum time, the UE considers that $N_1$ and $N_2$ correspond to the smaller of the SCS configurations for the PDSCH and the PUSCH. For $\mu=0$, the UE assumes $N_{1,0}=14$ [6, TS 38.214].

As discussed in the foregoing description, a configured grant may be overridden by a dynamic grant and/or a random access response (RAR) grant on a same serving cell. In some systems, a processing timeline may be only defined for a scenario in which a configured grant is overridden by a dynamic grant. A processing timeline is not defined for a scenario in which a configured grant is overridden by a RAR grant. In some systems, a RAR grant may override a configured grant irrespective of a timing relationship of the RAR grant and the configured grant. Accordingly, a RAR grant may override a configured grant even if the RAR grant is conveyed to the UE very late, such as directly before a starting symbol of the configured grant, which puts a constraint on the UE processing. In such a scenario, the UE has to process a RAR and a potential RAR grant very quickly such that the UE is able to determine, as soon as possible, that a configured grant is overridden by a RAR grant and such that the UE behaves accordingly (e.g., the UE behaves in accordance with the RAR grant, rather than the configured grant that is overridden by the RAR grant). Further, the processing timeline used for the scenario in which a dynamic grant overrides a configured grant may not be used for the scenario in which a configured grant is overridden by a RAR grant because the processing of PDCCH and RAR may be different from each other. In some examples, after decoding a PDCCH associated with a dynamic grant, information related to the dynamic grant is known. However, for a RAR grant, after receiving and decoding a PDCCH associated with the RAR grant, the UE may need to receive and decode a PDSCH (e.g., the PDSCH is transmitted later than the PDCCH). After decoding the PDSCH (and/or a RAR grant), the UE may need to search to determine whether or not there is a RAR grant for the UE. Therefore, a reference point of the processing timeline may not be the end of a PDCCH and, thus, a different reference point for the processing timeline may be required. Another difference between a RAR grant overriding a configured grant and a dynamic grant overriding a configured grant is that, for a RAR grant, the base station may not know which UE may use the RAR grant (e.g., whereas for a dynamic grant, the base station knows which UE will use the dynamic grant). In some examples, in some situations, the base station may not be able to avoid a scenario in which a RAR grant schedules one or more resources overlapping (in time domain) with one or more resources of a configured grant and in which a last symbol of the RAR grant (e.g., a last symbol of a PDSCH carrying the RAR grant) is not at least X symbols before a start symbol of a PUSCH that is based upon the configured grant (e.g., X may be defined based upon a processing timeline for a RAR grant overriding a configured grant). Accordingly, techniques are needed for handling a scenario in which a time domain overlap between a RAR grant and a configured grant occurs and/or in which reception of the RAR grant is too close to a start of the configured grant (e.g., where the reception is less than a threshold amount of time earlier than the start of the configured grant).

In a first example concept of the present disclosure, a processing timeline for a RAR grant overriding a configured grant is defined. In some examples, the processing timeline is the same as a second processing timeline for a dynamic grant overriding a configured grant. Alternatively and/or additionally, the processing timeline may be different than a second processing timeline for a dynamic grant overriding a configured grant. In some examples, a reference point for the processing timeline may be a last symbol of a PDCCH CRC scrambled with RA-RNTI. Alternatively and/or additionally, the reference point for the processing timeline may be a last symbol of a PDCCH scheduling RAR for a UE. Alternatively and/or additionally, the reference point for the processing timeline may be a last symbol of a PDSCH carrying a RAR grant for a UE. The UE may override a configured grant with a RAR grant if the reference point for the processing timeline is at least X symbols before a starting symbol of the configured grant. The reference point may be at least X symbols before the starting symbol of the configured grant in a scenario in which the reference point is earlier than the starting symbol of the configured grant and a quantity of symbols between the reference point and the starting symbol is equal to or greater than X symbols. Alternatively and/or additionally, the UE may not override the configured grant with the RAR grant if the reference point for the processing timeline is not at least X symbols before the starting symbol of the configured grant. The reference point may not be at least X symbols before the starting symbol of the configured grant in a scenario in which the reference point is after the starting symbol and/or in a scenario in which the reference point is earlier than the starting symbol of the configured grant and a quantity of symbols between the reference point and the starting symbol is less than X symbols. In an example, the UE may perform PUSCH transmission based upon the configured grant if the reference point for the processing timeline is not at least X symbols before the starting symbol of the configured grant. Alternatively and/or additionally, the UE may not perform PUSCH transmission based upon the RAR grant if the reference point for the processing timeline is not at least X symbols before the starting symbol of the configured grant. In some examples, X is equal to $N_2$. $N_2$ may be a number of symbols corresponding to a PUSCH preparation time. Alternatively and/or additionally, X may be different than $N_2$. For example, X may be larger than $N_2$. X may be determined based upon a processing time for RAR grant (e.g., the processing time may correspond to an amount of time it takes for the UE to process the RAR grant).

In some examples, the UE may override a configured grant with a RAR grant if the reference point for the processing timeline is at least X milliseconds earlier than a starting symbol of the configured grant. The reference point may be at least X milliseconds earlier than the starting symbol of the configured grant in a scenario in which the reference point is earlier than the starting symbol of the configured grant and a duration of time by which the reference point is earlier than the starting symbol is equal to or greater than X milliseconds. Alternatively and/or additionally, the UE may not override the configured grant with the RAR grant if the reference point for the processing timeline is not at least X milliseconds earlier than the starting symbol of the configured grant. The reference point may not be at least X milliseconds earlier than the starting symbol of the configured grant in a scenario in which the reference point is after the starting symbol of the configured grant and/or in a scenario in which the reference point is earlier than the starting symbol of the configured grant and a duration of time by which the reference point is earlier than the starting symbol is less than X milliseconds. In an example, the UE may perform PUSCH transmission based upon the configured grant if the reference point for the processing timeline is not at least X milliseconds earlier than the starting symbol of the configured grant. Alternatively and/or additionally, UE may not perform PUSCH transmission based upon the RAR grant if the reference point for the processing timeline is not at least X milliseconds earlier than the starting symbol of the configured grant. In some examples, X may be determined based upon $T_1$. Alternatively and/or additionally, X may be determined based upon $T_2$. Alternatively and/or additionally, X may be determined based upon $T_3$. Alternatively and/or additionally, X may be determined based upon $T_1$, $T_2$ and/or $T_3$. Alternatively and/or additionally, X may be determined based upon a sum of $T_1$ and $T_2$. Alternatively and/or additionally, X may be determined based upon a sum of $T_1$, $T_2$ and $T_3$. In some examples, $T_3$ may be 0.5 milliseconds. For example, X may be equal to $T_1+T_2+0.5$. In some examples, $T_1$ may be a time duration corresponding to a PDSCH processing time. In some examples, $T_2$ may be a time duration corresponding to a PUSCH preparation time. In some examples, $T_3$ may be a time duration corresponding to inter-layer processing and/or communication, e.g., processing and/or communication between a physical layer and a MAC layer. Alternatively and/or additionally, $T_3$ may be a time duration corresponding to processing of a RAR message. In some examples, $T_1$ may be equal to a time duration of $N_1$ symbols. In some examples, $T_2$ may be equal to a time duration of $N_2$ symbols. A UE may determine whether or not to override a configured grant with a RAR grant based upon the processing timeline.

In a second example concept of the present disclosure, a base station may not schedule a RAR grant that is associated with a first resource (e.g., a first PUSCH scheduled by the RAR grant) that overlaps with one or more resources (e.g., one or more PUSCHs associated with one or more transmission occasions) of configured grants of a group of UEs. For example, the base station shall not schedule a RAR grant that is associated with a first resource (e.g., a first PUSCH scheduled by the RAR grant) that overlaps with one or more resources (e.g., one or more PUSCHs associated with one or more transmission occasions) of configured grants of a group of UEs (e.g., the base station may be configured such that the base station does not schedule a RAR grant that is associated with a first resource that overlaps with one or more resources associated with configured grants of a group of UEs). The base station avoids scheduling a resource (e.g., a resource of a RAR grant) that overlaps with one or more resources of configured grants of a group of UEs. In some examples, the group of UEs may comprise some and/or all UEs in a cell. In some examples, the group of UEs are UEs that may utilize the RAR grant. In some examples, the RAR grant is associated with a PRACH resource. In some examples, the group of UEs are UEs configured with the PRACH resource.

In a third example concept of the present disclosure, a base station schedules a RAR grant with a scheduling delay larger than a value. The scheduling delay may be a time duration between a last symbol of a PDSCH reception conveying a RAR message with a RAR grant (e.g., a RAR uplink grant) and a first symbol (e.g., an initial and/or starting symbol) of a corresponding PUSCH transmission scheduled by the RAR grant. The value is larger than a minimum scheduling delay for RAR. If a base station schedules a RAR grant with a larger scheduling delay, the base station may transmit the RAR message (with the RAR grant) earlier (such as to account for the larger scheduling delay). By scheduling the RAR grant with the scheduling delay that is larger than the value, a UE (that receives the RAR message, for example) has sufficient time to process and/or handle the RAR grant and/or to override a configured grant with the RAR grant. In some examples, the base station does not schedule a RAR grant with a scheduling delay smaller than the value. For example, the base station shall not schedule a RAR grant with a scheduling delay smaller than the value (e.g., the base station may be configured such that the base station does not schedule a RAR grant with a scheduling delay smaller than the value). In some examples, the base station does not schedule a RAR grant with a scheduling delay smaller than the value if a resource (e.g., a first PUSCH) of the RAR grant would overlap with one or more resources of configured grants of a group of UEs. The base station shall not schedule a RAR grant with a scheduling delay smaller than the value if a resource (e.g., a first PUSCH) of the RAR grant would overlap with one or more resources of configured grants of a group of UEs (e.g., the base station may be configured such that the base station does not schedule a RAR grant with a scheduling delay smaller than the value if the resource of the RAR grant would overlap with one or more resources of configured grants of the group of UEs).

In some examples, the group of UEs may comprise some and/or all UEs in a cell. In some examples, the group of UEs are UEs that may utilize the RAR grant. In some examples, the RAR grant is associated with a PRACH resource. In some examples, the group of UEs are UEs configured with the PRACH resource.

In some examples, the value is determined based upon Y. Alternatively and/or additionally, the value may be determined based upon Z. Alternatively and/or additionally, the value may be determined based upon Y and Z. For example, the value may be determined based upon a sum of Y and Z. In an example, the value may be equal to Y+Z. In some examples, Y is determined based upon a minimum scheduling delay for RAR. For example, Y may be equal to a minimum scheduling delay for RAR. Alternatively and/or additionally, Y may be determined based upon a time duration corresponding to a PDSCH processing time and/or a time duration corresponding to a PUSCH preparation time. For example, Y may be determined based upon a sum of the time duration corresponding to the PDSCH processing time and the time duration corresponding to the PUSCH preparation time. For example, Y may be equal to $T_1+T_2+0.5$, where $T_1$ may be the time duration corresponding to the PDSCH processing time and/or $T_2$ may be the time duration corresponding to the PUSCH preparation time. In some examples, Z is determined based upon a difference between a starting symbol of a configured grant PUSCH (e.g., a PUSCH of the configured grant, such as a PUSCH, scheduled by the configured grant, with which a UE can perform a PUSCH transmission) and a starting symbol of a RAR grant PUSCH (e.g., a PUSCH of the RAR grant, such as a PUSCH, scheduled by the RAR grant, with which a UE can perform a PUSCH transmission), wherein the configured grant PUSCH and the RAR grant PUSCH may overlap (in time domain). Alternatively and/or additionally, Z may be determined based upon a maximum difference between a starting symbol of a configured grant PUSCH and a starting symbol of a RAR grant PUSCH, wherein the configured grant PUSCH and the RAR grant PUSCH may overlap (in time domain). Alternatively and/or additionally, Z may be a fixed value. Alternatively and/or additionally, Z may be equal to a time duration of 1 slot. Alternatively and/or additionally, Z may be equal to a time duration of 0.5 slot. Alternatively and/or additionally, Z may be equal to 1 millisecond. Alternatively and/or additionally, Z may be equal to 0.5 milliseconds.

In a first example embodiment of the present disclosure, a UE receives a configured grant. In some examples, the configured grant is activated. In some examples, the configured grant is initialized. In some examples, the configured grant is available for the UE to transmit uplink data (such as using one or more resources, such as a PUSCH, of the configured grant). The UE receives a RAR grant. In some examples, the RAR grant schedules a first PUSCH. In some examples, the first PUSCH of the RAR grant overlaps with a second PUSCH of the configured grant. For example, a first PUSCH duration of the RAR grant (e.g., a duration and/or a time period of the first PUSCH) overlaps with a second PUSCH duration of the configured grant (e.g., a duration and/or a time period of the second PUSCH of the configured grant). For example, a duration and/or a time period of the first PUSCH of the RAR grant overlaps with a duration and/or a time period of the second PUSCH of the configured grant.

In some examples, the UE overrides the configured grant with the RAR grant if a last symbol of the RAR grant is at least a first time duration earlier than a first symbol (e.g., an initial and/or starting symbol) of a transmission occasion (or a transmission opportunity) of the configured grant. The transmission occasion or the transmission opportunity of the configured grant may be a set of symbols (e.g., a set of one or more symbols) in which the UE is configured and/or allowed to transmit a PUSCH with the configured grant. In some examples, the UE may not override the configured grant with the RAR grant if the last symbol of the RAR grant is not at least the first time duration earlier than the first symbol of the transmission occasion (or the transmission opportunity) of the configured grant. In some examples, the UE determines whether or not to override the configured grant with the RAR grant based upon whether or not the last symbol of the RAR grant is not at least the first time duration earlier than the first symbol of the transmission occasion (or the transmission opportunity) of the configured grant. In some examples, the UE performs PUSCH transmission based upon the RAR grant and the UE does not perform PUSCH transmission based upon the configured grant if the last symbol of the RAR grant is at least the first time duration earlier than the first symbol of the transmission occasion (or the transmission opportunity) of the configured grant. In some examples, the UE performs PUSCH transmission based upon the RAR grant if the last symbol of the RAR grant is at least the first time duration earlier than the first symbol of the transmission occasion (or the transmission opportunity) of the configured grant. In some examples, the UE may not perform PUSCH transmission based upon the configured grant if the last symbol of the RAR grant is at least the first time duration earlier than the first symbol of the transmission occasion (or the transmission opportunity) of the configured grant. In some examples, the UE may not perform PUSCH transmission based upon the RAR grant if the last symbol of the RAR grant is not at least the first time duration earlier than the first symbol of the transmission occasion (or the transmission opportunity) of the configured grant. In some examples, the UE may not perform PUSCH transmission based upon the configured grant if the last symbol of the RAR grant is at least the first time duration earlier than the first symbol of the transmission occasion (or the transmission opportunity) of the configured grant. In some examples, the UE performs PUSCH transmission based upon the configured grant if the last symbol of the RAR grant is not at least the first time duration earlier than the first symbol of the transmission occasion (or the transmission opportunity) of the configured grant.

In some examples, the UE performs a first part of a PUSCH transmission based upon the configured grant if the last symbol of the RAR grant is not at least the first time duration earlier than the first symbol of the transmission occasion (or the transmission opportunity) of the configured grant. In some examples, the UE does not perform a second part of the PUSCH transmission based upon the configured grant if the last symbol of the RAR grant is not at least the first time duration earlier than the first symbol of the transmission occasion (or the transmission opportunity) of the configured grant. In some examples, the first part of PUSCH transmission does not overlap with the first PUSCH. In some examples, the second part of PUSCH transmission overlaps with the first PUSCH.

The first time duration is a duration of time (e.g., a time-length and/or a period of time). The first time duration may be determined based upon a second time duration. The second time duration may correspond to a PDSCH processing time (e.g., the second time duration may be, be equal to, and/or have a length of the PDSCH processing time). The second time duration may correspond to a time duration of $N_1$ symbols (e.g., the second time duration may be, be equal to, and/or have a length of the time duration of $N_1$ symbols). The first time duration may be determined based upon a third time duration. The third time duration may correspond to a PUSCH preparation time (e.g., the third time duration may be, be equal to, and/or have a length of the PUSCH preparation time). The third time duration may correspond to a time duration of $N_2$ symbols (e.g., the third time duration may be, be equal to, and/or have a length of the time duration of $N_2$ symbols). The first time duration may be determined based upon a fourth time duration. The fourth time duration may correspond to processing of a RAR message. For example, the fourth time duration may correspond to a duration of time it takes for the UE to process the RAR message (e.g., the fourth time duration may be, be equal to, and/or have a length of the duration of time it takes for the UE to process the RAR message). Alternatively and/or additionally, the fourth time duration may correspond to inter-layer processing and/or communication. For example, the fourth time duration may correspond to a duration of time it takes for the UE to perform the inter-layer processing and/or communication. In some examples, the fourth time duration is a fixed value. The fourth time duration may correspond to 0.5 milliseconds (e.g., the fourth time duration may be, be equal to, and/or have a length of 0.5 milliseconds). The first time duration may be determined based upon the second time duration, the third time duration and/or the fourth time duration. The first time duration may be determined based upon a sum of the second time duration and the third time duration. The first time duration may be determined based upon a sum of the second time duration, the third time duration and the fourth time duration. In some examples, the first time duration may correspond to the second time duration (e.g., the first time duration may be, be equal to, and/or have a length of the second time duration). Alternatively and/or additionally, the first time duration may correspond to the third time duration (e.g., the first time duration may be, be equal to, and/or have a length of the third time duration). Alternatively and/or additionally, the first time duration may correspond to the fourth time duration (e.g., the first time duration may be, be equal to, and/or have a length of the fourth time duration). The first time duration may correspond to a sum of the second time duration, the third time duration and the fourth time duration (e.g., the first time duration may be, be equal to, and/or have a length of the sum of the second time duration, the third time duration and the fourth time duration). The first time duration may correspond to $N_1$ symbols (e.g., the first time duration may be, be equal to, and/or have a length of $N_1$ symbols). The first time duration may correspond to $N_2$ symbols (e.g., the first time duration may be, be equal to, and/or have a length of $N_2$ symbols). The first time duration may correspond to 0.5 milliseconds (e.g., the first time duration may be, be equal to, and/or have a length of 0.5 milliseconds). The first time duration may correspond to $T_1+T_2+0.5$ milliseconds (e.g., the first time duration may be, be equal to, and/or have a length of $T_1+T_2+0.5$ milliseconds). $T_1$ may correspond to a time duration of $N_1$ symbols (e.g., $T_1$ may be, be equal to, and/or have a length of the time duration of $N_1$ symbols). $T_2$ may correspond to a time duration of $N_2$ symbols (e.g., $T_2$ may be, be equal to, and/or have a length of the time duration of $N_2$ symbols).

In some examples, the UE may not expect to handle a scenario in which the last symbol of the RAR grant is not at least the first time duration earlier than the first symbol of the transmission occasion (or the transmission opportunity) of the configured grant and in which a resource, such as the second PUSCH, of the configured grant overlaps with a resource, such as the first PUSCH, of the RAR grant. UE behavior, for the scenario in which the last symbol of the RAR grant is not at least the first time duration earlier than the first symbol of the transmission occasion (or the transmission opportunity) of the configured grant and in which the resource of the configured grant overlaps with the resource of the RAR grant, may not specified for the UE. For example, the UE may consider such a scenario (in which the last symbol of the RAR grant is not at least the first time duration earlier than the first symbol of the transmission occasion (or the transmission opportunity) of the configured grant and in which the resource of the configured grant overlaps with the resource of the RAR grant) to be an error (e.g., an error case).

In a second example embodiment of the present disclosure, a base station schedules a RAR grant. The base station configures one or more configured grants to one or more UEs (e.g., the base station configures the one or more UEs with the one or more configured grants). In some examples, the one or more configured grants are initialized. In some examples, the base station ensures that a scenario, in which a last symbol of the RAR grant is not at least a first time duration earlier than a first symbol (e.g., an initial and/or starting symbol) of a transmission occasion (or a transmission opportunity) of a configured grant of the one or more configured grants and in which a resource of the configured grant overlaps with a resource of the RAR grant, does not occur. The resource of the configured grant may correspond to a PUSCH associated with a transmission occasion of the configured grant (such as a PUSCH for performing a PUSCH transmission). The resource of the RAR grant may correspond to a PUSCH of the RAR grant, such as scheduled by the RAR grant for performing a PUSCH transmission.

In some examples, the base station ensures that the last symbol of the RAR grant is at least the first time duration earlier than the first symbol of the transmission occasion (or the transmission opportunity) of the configured grant. In some examples, if a resource of the configured grant overlaps with a resource of the RAR grant, the base station ensures that the last symbol of the RAR grant is at least the first time duration earlier than the first symbol of the transmission occasion (or the transmission opportunity) of the configured grant.

In some examples, the base station schedules a RAR grant such that the last symbol of the RAR grant is at least the first time duration earlier than the first symbol of the transmission occasion (or the transmission opportunity) of the configured grant. In some examples, if a resource of the configured grant overlaps with a resource of the RAR grant, the base station schedules the RAR grant such that the last symbol of the RAR grant is at least the first time duration earlier than the first symbol of the transmission occasion (or the transmission opportunity) of the configured grant.

In some examples, the base station is not allowed to schedule a RAR grant in such a way that a last symbol of the RAR grant is not at least the first time duration earlier than the first symbol of the transmission occasion (or the transmission opportunity) of the configured grant. In some examples, the base station is not allowed to schedule a RAR grant in such a way that a last symbol of the RAR grant is not at least the first time duration earlier than the first symbol of the transmission occasion (or the transmission opportunity) of the configured grant if a resource of the configured grant overlaps with a resource of the RAR grant.

In some examples, the base station schedules RAR with a large scheduling delay (e.g., a scheduling delay larger than a threshold). In some examples, the base station is not allowed to schedule RAR with a minimum scheduling delay. In some examples, the base station schedules RAR with the large scheduling delay if the resource of the configured grant overlaps with the resource of the RAR grant. In some examples, the base station schedules RAR with a scheduling delay if the resource of the configured grant overlaps with the resource of the RAR grant, where the scheduling delay is larger than a value. In some examples, the base station is not allowed to schedule RAR with the minimum scheduling delay if the resource of the configured grant overlaps the resource of the RAR grant. In some examples, the base station is not allowed to schedule RAR with a scheduling delay which is less than the value if the resource of the configured grant overlaps with the resource of the RAR grant. In some examples, the base station is not allowed to schedule RAR with a minimum scheduling delay. In some examples, the base station is not allowed to schedule RAR with a scheduling delay which is less than the value.

In some examples, the value is determined based upon a minimum scheduling delay of a RAR grant. In some examples, the value is a sum of the minimum scheduling delay and a constant. The constant may correspond to 1 slot (e.g., the constant may be and/or be equal to 1 slot and/or a time duration of 1 slot). In some examples, the value is larger than the minimum scheduling delay. Using a large scheduling delay (e.g., a scheduling delay that is at least equal to the value) may ensure that the last symbol of the RAR grant is at least the first time duration earlier than the first symbol of the transmission occasion (or the transmission opportunity) of the configured grant.

In some examples, the base station ensures that a resource of a RAR grant does not overlap with a resource of a configured grant. The resource of the configured grant may correspond to a PUSCH associated with a transmission occasion of the configured grant (such as a PUSCH for performing a PUSCH transmission). The resource of the RAR grant may correspond to a PUSCH of the RAR grant, such as scheduled by the RAR grant for performing a PUSCH transmission. In some examples, the base station schedules the resource of the RAR grant such that the resource of the RAR grant does not overlap with the resource of the configured grant. In some examples, the base station is not allowed to schedule the resource of the RAR grant in such a way that the resource of the RAR grant overlaps with the resource of the configured grant. In some examples, the base station ensures that the resource of the RAR grant does not overlap with the resource of the configured grant if a scheduling delay of the RAR grant is smaller than the value. In some examples, the base station schedules the resource of the RAR grant such that the resource of the RAR grant does not overlap with the resource of the configured grant if a scheduling delay of the RAR grant is smaller than the value. In some examples, the base station is not allowed to schedule the resource of the RAR grant in such a way that the resource of the RAR grant overlaps with the resource of the configured grant if a scheduling delay of the RAR grant is smaller than the value.

In some examples, the configured grant is for one UE. Alternatively and/or additionally, the configured grant may be for a group of UEs. The group of UEs may comprise some and/or all UEs in a cell. In some examples, the group of UEs are UEs that may use and/or potentially use the RAR grant. In some examples, the group of UEs are UEs configured with a PRACH resource associated with the RAR grant.

The first time duration is a duration of time (e.g., a time-length and/or a period of time). The first time duration may be determined based upon a second time duration. The second time duration may correspond to a PDSCH processing time (e.g., the second time duration may be, be equal to, and/or have a length of the PDSCH processing time). The second time duration may correspond to a time duration of $N_1$ symbols (e.g., the second time duration may be, be equal to, and/or have a length of the time duration of $N_1$ symbols). The first time duration may be determined based upon a third time duration. The third time duration may correspond to a PUSCH preparation time (e.g., the third time duration may be, be equal to, and/or have a length of the PUSCH preparation time). The third time duration may correspond to a time duration of $N_2$ symbols (e.g., the third time duration may be, be equal to, and/or have a length of the time duration of $N_2$ symbols). The first time duration may be determined based upon a fourth time duration. The fourth time duration may correspond to processing of a RAR message. For example, the fourth time duration may correspond to a duration of time it takes for the UE to process the RAR message (e.g., the fourth time duration may be, be equal to, and/or have a length of the duration of time it takes for the UE to process the RAR message). Alternatively and/or additionally, the fourth time duration may correspond to inter-layer processing and/or communication. For example, the fourth time duration may correspond to a duration of time it takes for the UE to perform the inter-layer processing and/or communication. In some examples, the fourth time duration is a fixed value. The fourth time duration may correspond to 0.5 milliseconds (e.g., the fourth time duration may be, be equal to, and/or have a length of 0.5 milliseconds). The first time duration may be determined based upon the second time duration, the third time duration and/or the fourth time duration. The first time duration may be determined based upon a sum of the second time duration and the third time duration. The first time duration may be determined based upon a sum of the second time duration, the third time duration and the fourth time duration. In some examples, the first time duration may correspond to the second time duration (e.g., the first time duration may be, be equal to, and/or have a length of the second time duration). Alternatively and/or additionally, the first time duration may correspond to the third time duration (e.g., the first time duration may be, be equal to, and/or have a length of the third time duration). Alternatively and/or additionally, the first time duration may correspond to the fourth time duration (e.g., the first time duration may be, be equal to, and/or have a length of the fourth time duration). The first time duration may correspond to a sum of the second time duration, the third time duration and the fourth time duration (e.g., the first time duration may be, be equal to, and/or have a length of the sum of the second time duration, the third time duration and the fourth time duration). The first time duration may correspond to $N_1$ symbols (e.g., the first time duration may be, be equal to, and/or have a length of $N_1$ symbols). The first time duration may correspond to $N_2$ symbols (e.g., the first time duration may be, be equal to, and/or have a length of $N_2$ symbols). The first time duration may correspond to 0.5 milliseconds (e.g., the first time duration may be, be equal to, and/or have a length of 0.5 milliseconds). The first time duration may correspond to $T_1+T_2+0.5$ milliseconds (e.g., the first time duration may be, be equal to, and/or have a length of $T_1+T_2+0.5$ milliseconds). $T_1$ may correspond to a time duration of $N_1$ symbols (e.g., $T_1$ may be, be equal to, and/or have a length of the time duration of $N_1$ symbols). $T_2$ may correspond to a time duration of $N_2$ symbols (e.g., $T_2$ may be, be equal to, and/or have a length of the time duration of $N_2$ symbols).

In some examples, one or more operations and/or techniques described herein with respect to a UE may be performed and/or applied by a base station. For example, the base station may determine and/or derive a timing using one or more techniques that are the same as or similar to one or more techniques described herein with respect to the UE determining and/or deriving the timing. In another example, the base station may determine and/or derive an interruption time using one or more techniques that are the same as or similar to one or more techniques described herein with respect to the UE determining and/or deriving the interruption time.

In some examples, one or more operations and/or techniques described herein with respect to a base station may be performed and/or applied by a UE. For example, the UE may determine and/or derive a timing using one or more techniques that are the same as or similar to one or more techniques described herein with respect to the base station determining and/or deriving the timing. In another example, the UE may determine and/or derive an interruption time using one or more techniques that are the same as or similar to one or more techniques described herein with respect to the base station determining and/or deriving the interruption time.

In some examples, one or more operations and/or techniques described herein with respect to a UE may be symmetrically applied to a base station. For example, an operation described herein of a UE performing reception of a message may be applied to a base station, i.e., where the base station performs transmission of the message, for example.

In some examples, one or more operations and/or techniques described herein with respect to a base station may be symmetrically applied to a UE. For example, an operation described herein of a base station performing reception of a message may be applied to a UE, i.e., where the UE performs transmission of the message, for example.

In some examples, if a UE prohibits and/or suspends reception and/or transmission (e.g., reception and/or transmission in a cell and/or reception and/or transmission to and/or from a base station) during a period of time, such as in accordance with one or more of the techniques described herein, the base station may prohibit and/or suspend reception and/or transmission (e.g., reception and/or transmission in a cell and/or reception and/or transmission to and/or from the UE) during the same period of time.

In some examples, if a base station prohibits and/or suspends reception and/or transmission (e.g., reception and/or transmission in a cell and/or reception and/or transmission to and/or from a UE) during a period of time, such as in accordance with one or more of the techniques described herein, the UE may prohibit and/or suspend reception and/or transmission (e.g., reception and/or transmission in a cell and/or reception and/or transmission to and/or from the base station) during the same period of time.

In a third example embodiment of the present disclosure, a UE is not expected to be scheduled, by a PDCCH and/or a PDSCH conveying RAR ending in symbol i, to transmit a PUSCH on a given serving cell overlapping in time with a transmission occasion, where the UE is allowed to transmit a PUSCH with a configured grant (such as in accordance with 3GPP TS 38.321 V15.7.0), starting in a symbol j on the same serving cell if the end of symbol i is not at least $N_2$ symbols before the beginning of symbol j. The value $N_2$ in symbols may be determined according to a UE processing capability (such as defined in Subclause 6.4 of 3GPP TS 38.214 V15.7.0). $N_2$ and the symbol duration may be based upon a minimum of the subcarrier spacing corresponding to the PUSCH with configured grant and the subcarrier spacing of the PDCCH or the PDSCH conveying RAR scheduling the PUSCH.

In a fourth example embodiment of the present disclosure, a UE is not expected to be scheduled, by a PDSCH conveying RAR ending in symbol i, to transmit a PUSCH on a given serving cell overlapping in time with a transmission occasion, where the UE is allowed to transmit a PUSCH with a configured grant (such as in accordance with 3GPP TS 38.321 V15.7.0), starting in a symbol j on the same serving cell if the end of symbol i is not at least $N_{T,1}+N_{T,2}+0.5$ milliseconds earlier than the beginning of symbol j, where $N_{T,1}$ is a time duration of $N_1$ symbols corresponding to a PDSCH processing time for UE processing capability 1 when additional PDSCH demodulation reference signal (DM-RS) is configured and/or $N_{T,2}$ is a time duration of $N_2$ symbols corresponding to a PUSCH preparation time for UE processing capability 1 (such as defined in 3GPP TS 38.214 V15.7.0). For determining the minimum time, the UE may consider that $N_1$ and $N_2$ correspond to the smaller of subcarrier spacing configurations for the PDSCH and the PUSCH. For $\mu=0$, the UE may assume $N_{1,0}=14$ (such as defined in 3GPP TS 38.214 V15.7.0).

Throughout the present disclosure, the term "overlap" may correspond to at least partial overlap in time domain. Two signals overlap may mean the two signals are (e.g., scheduled to be) on at least one same symbol (e.g., OFDM symbol).

Techniques and/or operations described throughout the present disclosure may correspond to behavior and/or operations of a single serving cell, unless otherwise noted. Techniques and/or operations provided herein may be applied using a single serving cell.

Techniques and/or operations described throughout the present disclosure may correspond to behavior and/or operations of multiple serving cells, unless otherwise noted. Techniques and/or operations provided herein may be applied using multiple serving cells.

With respect to embodiments of the present disclosure, a base station may configure multiple bandwidth parts to a UE (e.g., the base station may configure the UE with multiple bandwidth parts), unless otherwise noted.

With respect to embodiments of the present disclosure, a base station may configure a single bandwidth part to a UE (e.g., the base station may configure the UE with a single bandwidth part), unless otherwise noted.

One, some and/or all of the foregoing techniques and/or embodiments can be formed to a new embodiment.

In some examples, embodiments disclosed herein, such as embodiments described with respect to the first example concept, the second example concept, the third example concept, the first example embodiment, the second example embodiment, the third example embodiment and the fourth example embodiment, may be implemented independently and/or separately. Alternatively and/or additionally, a combination of embodiments described herein, such as embodiments described with respect to the first example concept, the second example concept, the third example concept, the first example embodiment, the second example embodiment, the third example embodiment and/or the fourth example embodiment, may be implemented. Alternatively and/or additionally, a combination of embodiments described herein, such as embodiments described with respect to the first example concept, the second example concept, the third example concept, the first example embodiment, the second example embodiment, the third example embodiment and/or the fourth example embodiment, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

Figure 6:
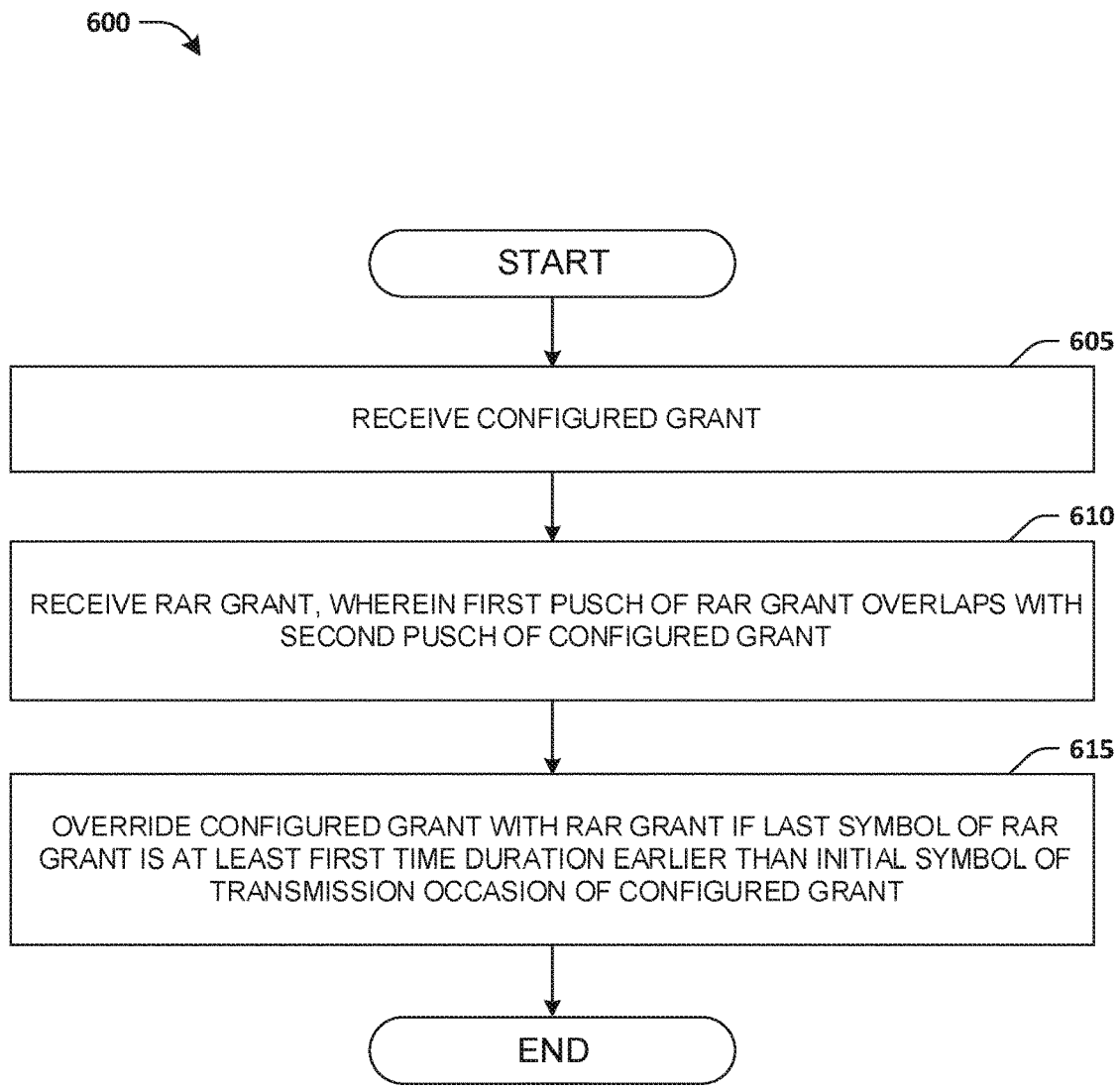
FIG. 6 is a flow chart according to one exemplary embodiment.

FIG. 6 is a flow chart 600 according to one exemplary embodiment from the perspective of a UE. In step 605, the UE receives a configured grant. In step 610, the UE receives a RAR grant, wherein a first PUSCH of the RAR grant overlaps with a second PUSCH of the configured grant. For example, one or more symbols of the first PUSCH may overlap with one or more symbols of the second PUSCH. In step 615, the UE overrides the configured grant with the RAR grant if a last symbol of the RAR grant is at least a first time duration earlier than an initial symbol of a transmission occasion of the configured grant.

In one embodiment, the UE does not override the configured grant with the RAR grant if the last symbol of the RAR grant is not at least the first time duration earlier than the initial symbol of the transmission occasion of the configured grant.

In one embodiment, the UE transmits PUSCH (e.g., the first PUSCH) based upon the RAR grant and does not transmit PUSCH (e.g., the second PUSCH) based upon the configured grant if the last symbol of the RAR grant is at least the first time duration earlier than the initial symbol of the transmission occasion of the configured grant.

In one embodiment, the UE does not transmit PUSCH (e.g., the first PUSCH) based upon the RAR grant and transmits PUSCH (e.g., the second PUSCH) based upon the configured grant if the last symbol of the RAR grant is not at least the first time duration earlier than the initial symbol of the transmission occasion of the configured grant.

In one embodiment, the UE transmits PUSCH (e.g., the first PUSCH) based upon the RAR grant and transmits PUSCH (e.g., the second PUSCH) based upon the configured grant if the last symbol of the RAR grant is not at least the first time duration earlier than the initial symbol of the transmission occasion of the configured grant.

In one embodiment, the UE transmits one of a configured grant PUSCH (e.g., the second PUSCH) or a RAR grant PUSCH (e.g., the first PUSCH) during a period of time in which the first PUSCH and the second PUSCH overlap.

In one embodiment, the first time duration is determined based upon a second time duration corresponding to a PDSCH processing time.

In one embodiment, the first time duration is determined based upon a third time duration corresponding to a PUSCH preparation time.

In one embodiment, the first time duration is determined based upon a fourth time duration corresponding to processing of a RAR message (e.g., a time it takes for the UE to perform the processing of the RAR message, where the RAR message may carry the RAR grant).

In one embodiment, the fourth time duration corresponds to inter-layer processing and/or communication (e.g., the fourth time duration may correspond to the processing of the RAR message and inter-layer processing and/or communication, such as a time it takes for the UE to perform the processing of the RAR message and inter-layer processing and/or communication).

In one embodiment, the first time duration is determined based upon a sum of the second time duration, the third time duration and the fourth time duration.

In one embodiment, the first time duration is $T_1+T_2+0.5$ milliseconds.

In one embodiment, $T_1$ is a time duration of $N_1$ symbols.
In one embodiment, $T_1$ is the second time duration.
In one embodiment, $T_2$ is a time duration of $N_2$ symbols.
In one embodiment, $T_2$ is the third time duration.

Referring back to FIGS. 3 and 4, in one exemplary embodiment of a UE, the device 300 includes a program code 312 stored in the memory 310. The CPU 308 could execute program code 312 to enable the UE (i) to receive a configured grant, (ii) to receive a RAR grant, wherein a first PUSCH of the RAR grant overlaps with a second PUSCH of the configured grant, and (iii) to override the configured grant with the RAR grant if a last symbol of the RAR grant is at least a first time duration earlier than an initial symbol of a transmission occasion of the configured grant. Furthermore, the CPU 308 can execute the program code 312 to perform one, some and/or all of the above-described actions and steps and/or others described herein.

Figure 7:
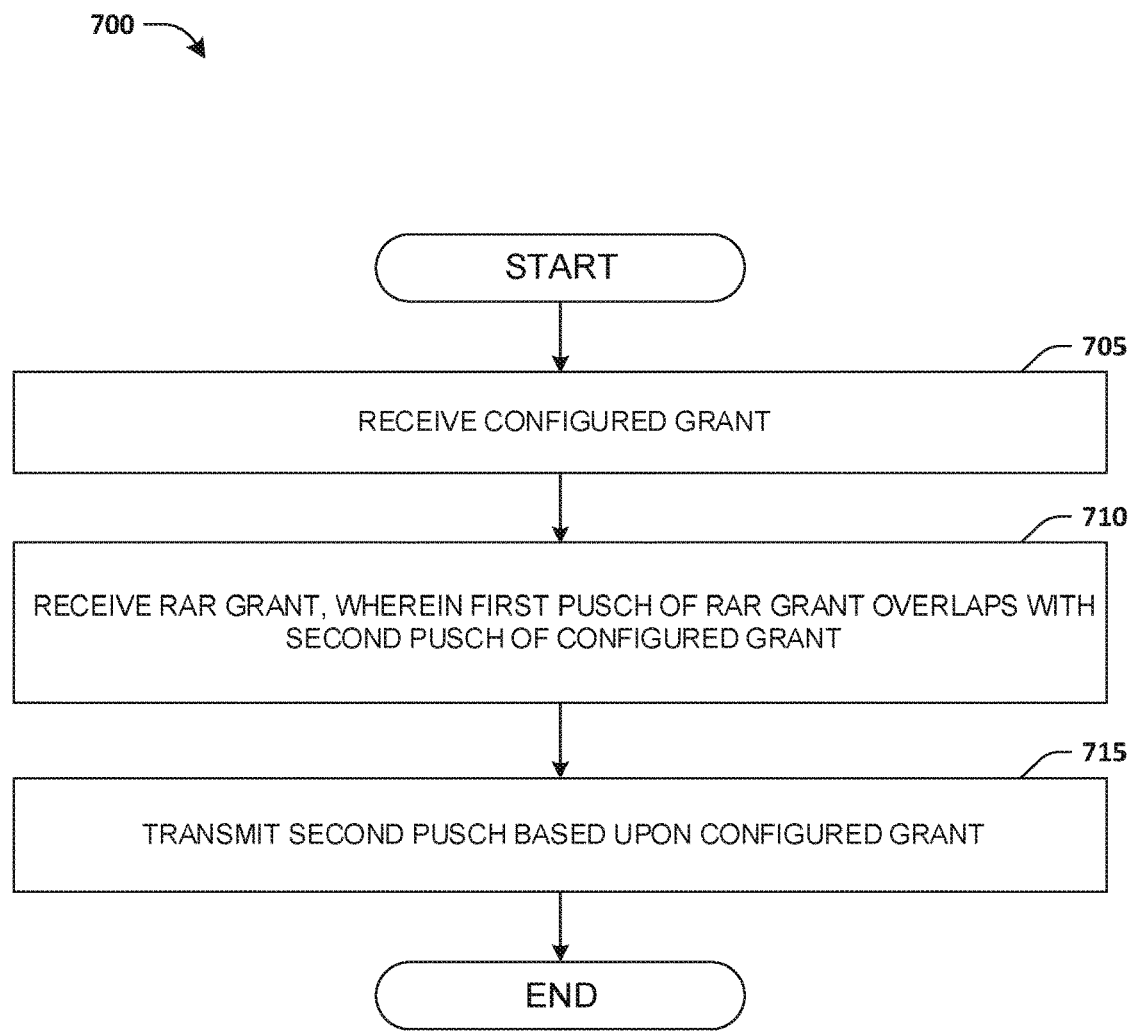
FIG. 7 is a flow chart according to one exemplary embodiment.

FIG. 7 is a flow chart 700 according to one exemplary embodiment from the perspective of a UE. In step 705, the UE receives a configured grant. In step 710, the UE receives a RAR grant, wherein a first PUSCH of the RAR grant overlaps with a second PUSCH of the configured grant. For example, one or more symbols of the first PUSCH may overlap with one or more symbols of the second PUSCH. In step 715, the UE transmits the second PUSCH based upon the configured grant.

In one embodiment, the UE does not transmit the first PUSCH.

In one embodiment, the UE does not override the configured grant with the RAR grant.

In one embodiment, the UE does not override the configured grant with the RAR grant based upon (e.g., due to) a last symbol of the RAR grant not being at least a first time duration earlier than an initial symbol of a transmission occasion of the configured grant. For example, if the last symbol of the RAR grant is not at least the first time duration earlier than the initial symbol of the transmission occasion of the configured grant, the UE does not override the configured grant with the RAR grant.

In one embodiment, the transmitting the second PUSCH is performed based upon (e.g., due to) a time at which the RAR grant is received. In some examples, the time corresponds to a time of a last symbol of the RAR grant.

In one embodiment, the UE does not override the configured grant with the RAR grant based upon (e.g., due to) the time at which the RAR grant is received. For example, the UE may determine whether or not to override the configured grant with the RAR grant based upon the time at which the RAR grant is received and/or an initial symbol of a transmission occasion of the configured grant. For example, if the time is not at least a first time duration earlier than the initial symbol of the transmission occasion of the configured grant, the UE may not override the configured grant with the RAR grant (and/or the UE may transmit the second PUSCH based upon the configured grant). Alternatively and/or additionally, if the time is at least the first time duration earlier than the initial symbol of the transmission occasion of the configured grant, the UE may override the configured grant with the RAR grant (and/or the UE may transmit the first PUSCH based upon the RAR grant).

In one embodiment, the transmitting the second PUSCH is performed based upon (e.g., due to) an issue associated with a timeline (e.g., a processing timeline).

In one embodiment, the UE determines whether or not to override the configured grant with the RAR grant based upon the timeline. For example, a reference point of the timeline may correspond to a time at which the RAR grant is received. Alternatively and/or additionally, the reference point of the timeline may correspond to a time of a last symbol of the RAR grant. The UE may determine whether or not to override the configured grant with the RAR grant based upon the reference point and/or an initial symbol of a transmission occasion of the configured grant. For example, if the reference point is not at least a first time duration earlier than the initial symbol of the transmission occasion of the configured grant, the UE may not override the configured grant with the RAR grant (and/or the UE may transmit the second PUSCH based upon the configured grant). Alternatively and/or additionally, if the reference point is at least the first time duration earlier than the initial symbol of the transmission occasion of the configured grant, the UE may override the configured grant with the RAR grant (and/or the UE may transmit the first PUSCH based upon the RAR grant).

In one embodiment, the transmitting the second PUSCH is performed based upon (e.g., due to) a last symbol of the RAR grant not being at least a first time duration earlier than an initial symbol of a transmission occasion of the configured grant. For example, if the last symbol of the RAR grant is not at least the first time duration earlier than the initial symbol of the transmission occasion of the configured grant, the UE transmits the second PUSCH based upon the configured grant.

Referring back to FIGS. 3 and 4, in one exemplary embodiment of a UE, the device 300 includes a program code 312 stored in the memory 310. The CPU 308 could execute program code 312 to enable the UE (i) to receive a configured grant, (ii) to receive a RAR grant, wherein a first PUSCH of the RAR grant overlaps with a second PUSCH of the configured grant, and (iii) to transmit the second PUSCH based upon the configured grant. Furthermore, the CPU 308 can execute the program code 312 to perform one, some and/or all of the above-described actions and steps and/or others described herein.

Figure 8:
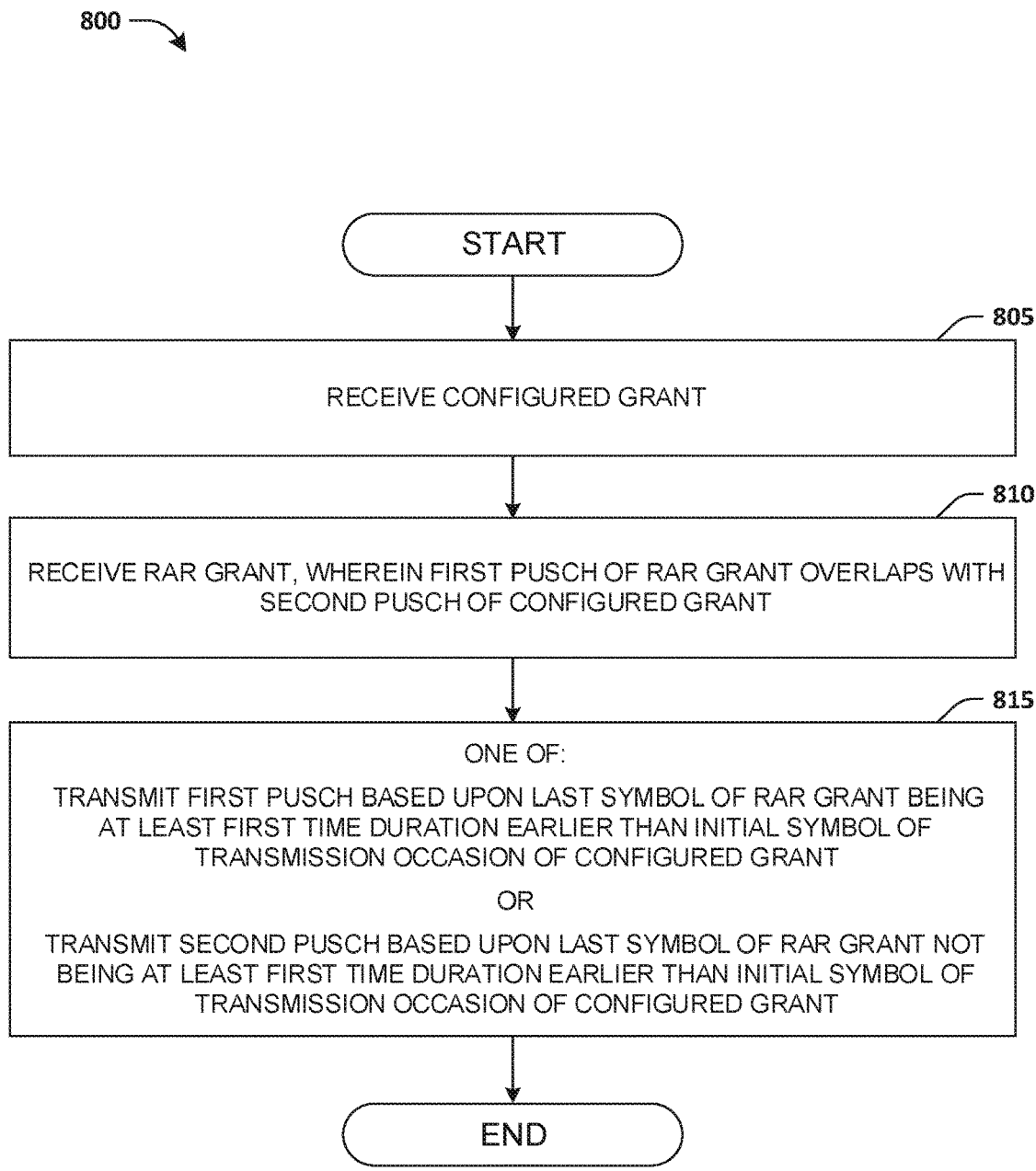
FIG. 8 is a flow chart according to one exemplary embodiment.

FIG. 8 is a flow chart 800 according to one exemplary embodiment from the perspective of a UE. In step 805, the UE receives a configured grant. In step 810, the UE receives a RAR grant, wherein a first PUSCH of the RAR grant overlaps with a second PUSCH of the configured grant. For example, one or more symbols of the first PUSCH may overlap with one or more symbols of the second PUSCH. In step 815, the UE transmits the first PUSCH based upon (e.g., due to) a last symbol of the RAR grant being at least a first time duration earlier than an initial symbol of a transmission occasion of the configured grant, or the UE transmits the second PUSCH based upon (e.g., due to) the last symbol of the RAR grant not being at least the first time duration earlier than the initial symbol of the transmission occasion of the configured grant.

For example, if the last symbol of the RAR grant is least the first time duration earlier than the initial symbol of the transmission occasion of the configured grant, the UE may transmit the first PUSCH. If the last symbol of the RAR grant is not at least the first time duration earlier than the initial symbol of the transmission occasion of the configured grant, the UE may transmit the second PUSCH.

In one embodiment, the UE overrides the configured grant with the RAR grant based upon (e.g., due to) the last symbol of the RAR grant being at least the first time duration earlier than the initial symbol of the transmission occasion of the configured grant. For example, if the last symbol of the RAR grant is at least the first time duration earlier than the initial symbol of the transmission occasion of the configured grant, the UE may override the configured grant with the RAR grant.

In one embodiment, the UE does not override the configured grant with the RAR grant based upon (e.g., due to) the last symbol of the RAR grant not being at least the first time duration earlier than the initial symbol of the transmission occasion of the configured grant. For example, if the last symbol of the RAR grant is not at least the first time duration earlier than the initial symbol of the transmission occasion of the configured grant, the UE may not override the configured grant with the RAR grant.

In one embodiment, the UE does not transmit the second PUSCH based upon (e.g., due to) the last symbol of the RAR grant being at least the first time duration earlier than the initial symbol of the transmission occasion of the configured grant. For example, if the last symbol of the RAR grant is at least the first time duration earlier than the initial symbol of the transmission occasion of the configured grant, the UE may not transmit the second PUSCH.

In one embodiment, the UE does not transmit the first PUSCH based upon the last symbol of the RAR grant not being at least the first time duration earlier than the initial symbol of the transmission occasion of the configured grant. For example, if the last symbol of the RAR grant is not at least the first time duration earlier than the initial symbol of the transmission occasion of the configured grant, the UE may not transmit the first PUSCH.

In one embodiment, the transmitting the first PUSCH is performed based upon the RAR grant.

In one embodiment, the transmitting the second PUSCH is performed based upon the configured grant.

Referring back to FIGS. 3 and 4, in one exemplary embodiment of a UE, the device 300 includes a program code 312 stored in the memory 310. The CPU 308 could execute program code 312 to enable the UE (i) to receive a configured grant, (ii) to receive a RAR grant, wherein a first PUSCH of the RAR grant overlaps with a second PUSCH of the configured grant, and (iii) to transmit the first PUSCH based upon a last symbol of the RAR grant being at least a first time duration earlier than the initial symbol of a transmission occasion of the configured grant, or to transmit the second PUSCH based upon the last symbol of the RAR grant not being at least the first time duration earlier than the initial symbol of the transmission occasion of the configured grant. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform one, some and/or all method steps illustrated in FIGS. 6-8. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 6-8, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node), such as where a UE is configured with a configured grant. The increased efficiency may be a result of enabling the UE to determine whether to override the configured grant with a RAR grant, such as in a scenario in which a resource of the RAR grant overlaps with a resource of the configured grant.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
   receiving a configured grant;
   receiving a Random Access Response (RAR) grant via a Physical Downlink Shared Channel (PDSCH), wherein a first Physical Uplink Shared Channel (PUSCH) of the RAR grant overlaps with a second PUSCH of the configured grant; and
   one of:
      transmitting the first PUSCH based upon a last symbol of the RAR grant being at least a first time duration earlier than an initial symbol of a transmission occasion of the configured grant, and overriding the configured grant with the RAR grant based upon the last symbol of the RAR grant being at least the first time duration earlier than the initial symbol of the transmission occasion of the configured grant; or
      transmitting the second PUSCH based upon the last symbol of the RAR grant not being at least the first time duration earlier than the initial symbol of the transmission occasion of the configured grant, and not overriding the configured grant with the RAR grant based upon the last symbol of the RAR grant not being at least the first time duration earlier than the initial symbol of the transmission occasion of the configured grant.

2. The method of claim 1, comprising:
   the transmitting the first PUSCH.

3. The method of claim 1, comprising:

the not overriding the configured grant with the RAR grant.

4. The method of claim 1, comprising:

the overriding the configured grant with the RAR grant.

5. The method of claim 1, wherein:

the transmitting the second PUSCH is performed based upon a time at which the RAR grant is received.

6. The method of claim 1, wherein:

the not overriding the configured grant with the RAR grant is based upon a time at which the RAR grant is received.

7. The method of claim 1, comprising:

the transmitting the second PUSCH.

8. A User Equipment (UE), comprising:

a control circuit;

a processor installed in the control circuit; and a memory installed in the control circuit and operatively coupled to the processor, wherein the processor is configured to execute a program code stored in the memory to perform operations, the operations comprising:

receiving a configured grant;

receiving a Random Access Response (RAR) grant via a Physical Downlink Shared Channel (PDSCH), wherein a first Physical Uplink Shared Channel (PUSCH) of the RAR grant overlaps with a second PUSCH of the configured grant; and one of:

transmitting the first PUSCH based upon a last symbol of the RAR grant being at least a first time duration earlier than an initial symbol of a transmission occasion of the configured grant, and overriding the configured grant with the RAR grant based upon the last symbol of the RAR grant being at least the first time duration earlier than the initial symbol of the transmission occasion of the configured grant; or transmitting the second PUSCH based upon the last symbol of the RAR grant not being at least the first time duration earlier than the initial symbol of the transmission occasion of the configured grant, and not overriding the configured grant with the RAR grant based upon the last symbol of the RAR grant not being at least the first time duration earlier than the initial symbol of the transmission occasion of the configured grant.

9. The UE of claim 8, the operations comprising:

the overriding the configured grant with the RAR grant based upon the last symbol of the RAR grant being at least the first time duration earlier than the initial symbol of the transmission occasion of the configured grant.

10. The UE of claim 8, the operations comprising:

the not overriding the configured grant with the RAR grant based upon the last symbol of the RAR grant not being at least the first time duration earlier than the initial symbol of the transmission occasion of the configured grant.

11. The UE of claim 8, the operations comprising:

the transmitting the second PUSCH.

12. The UE of claim 8, the operations comprising:

the transmitting the first PUSCH.

13. The UE of claim 8, wherein:

the transmitting the second PUSCH is performed based upon a time at which the RAR grant is received.

14. A non-transitory computer-readable medium comprising processor-executable instructions that when executed by a User Equipment (UE) cause performance of operations, the operations comprising:

receiving a configured grant;

receiving a Random Access Response (RAR) grant via a Physical Downlink Shared Channel (PDSCH), wherein a first Physical Uplink Shared Channel (PUSCH) of the RAR grant overlaps with a second PUSCH of the configured grant; and one of:

transmitting the first PUSCH based upon a last symbol of the RAR grant being at least a first time duration earlier than an initial symbol of a transmission occasion of the configured grant, and overriding the configured grant with the RAR grant based upon the last symbol of the RAR grant being at least the first time duration earlier than the initial symbol of the transmission occasion of the configured grant; or transmitting the second PUSCH based upon the last symbol of the RAR grant not being at least the first time duration earlier than the initial symbol of the transmission occasion of the configured grant, and not overriding the configured grant with the RAR grant based upon the last symbol of the RAR grant not being at least the first time duration earlier than the initial symbol of the transmission occasion of the configured grant.

15. The non-transitory computer-readable medium of claim 14, the operations comprising:

the transmitting the first PUSCH.

16. The non-transitory computer-readable medium of claim 14, the operations comprising:

the not overriding the configured grant with the RAR grant.

17. The non-transitory computer-readable medium of claim 14, comprising:

the overriding the configured grant with the RAR grant.

18. The non-transitory computer-readable medium of claim 14, wherein:

the transmitting the second PUSCH is performed based upon a time at which the RAR grant is received.

19. The non-transitory computer-readable medium of claim 14, wherein:

the not overriding the configured grant with the RAR grant is based upon a time at which the RAR grant is received.

20. The non-transitory computer-readable medium of claim 14, comprising:

the transmitting the second PUSCH.

\* \* \* \* \*